United States Patent
Villanueva Aylagas et al.

(10) Patent No.: US 12,406,419 B1
(45) Date of Patent: Sep. 2, 2025

(54) GENERATING FACIAL ANIMATION DATA FROM SPEECH AUDIO

(71) Applicant: Electronic Arts Inc., Redwood City, CA (US)

(72) Inventors: Monica Villanueva Aylagas, Sundbyberg (SE); Mattias Teye, Sundbyberg (SE); Hector Leon, Malmö (SE)

(73) Assignee: ELECTRONIC ARTS INC., Redwood City, CA (US)

( * ) Notice: Subject to any disclaimer, the term of this patent is extended or adjusted under 35 U.S.C. 154(b) by 204 days.

(21) Appl. No.: 18/128,997

(22) Filed: Mar. 30, 2023

Related U.S. Application Data

(60) Provisional application No. 63/327,647, filed on Apr. 5, 2022, provisional application No. 63/327,633, filed on Apr. 5, 2022.

(51) Int. Cl.
*G06T 13/20* (2011.01)
*G06T 13/40* (2011.01)
*G10L 25/30* (2013.01)

(52) U.S. Cl.
CPC .......... *G06T 13/205* (2013.01); *G06T 13/40* (2013.01); *G10L 25/30* (2013.01)

(58) Field of Classification Search
CPC ....... G06T 13/205; G06T 13/40; G10L 25/30; G10L 25/63; G10L 21/10; G10L 2021/10; G10L 2021/105; G06N 3/0475; G06N 20/00
See application file for complete search history.

(56) References Cited

U.S. PATENT DOCUMENTS

| | | | |
|---|---|---|---|
| 2018/0336464 A1* | 11/2018 | Karras | G06V 10/955 |
| 2020/0234690 A1* | 7/2020 | Savchenkov | G10L 13/08 |
| 2020/0302667 A1* | 9/2020 | del Val Santos | G06N 3/044 |

(Continued)

OTHER PUBLICATIONS

Abdal, Rameen, Yipeng Qin, and Peter Wonka, "Image2stylegan++: How to edit the embedded images?," In Proceedings of the IEEE/CVF conference on computer vision and pattern recognition, pp. 8296-8305, 2020.

(Continued)

*Primary Examiner* — King Y Poon
*Assistant Examiner* — Vincent Peren
(74) *Attorney, Agent, or Firm* — Gray Ice Higdon

(57) ABSTRACT

This specification provides a system comprising: or more computing devices; and one or more storage devices communicatively coupled to the one or more computing devices. The one or more storage devices store instructions that, when executed by the one or more computing devices, cause the one or more computing devices to perform operations comprising: receiving input data derived from speech audio; generating facial animation data, comprising processing the input data and a conditioning input using a machine-learned generative model; generating further animation data, comprising processing the input data using a further machine-learned generative model; and generating animation data for at least a face in a video game using the facial animation data and the further animation data, wherein the animation data animates at least the face in the video game in accordance with speech sounds of the speech audio.

15 Claims, 14 Drawing Sheets

(56) References Cited

U.S. PATENT DOCUMENTS

| | | | |
|---|---|---|---|
| 2021/0027511 A1* | 1/2021 | Shang | G06N 3/044 |
| 2021/0375260 A1* | 12/2021 | Yu | G10L 15/142 |
| 2022/0020196 A1* | 1/2022 | Kuta | G10L 21/10 |
| 2022/0068001 A1* | 3/2022 | Kaushik | G06T 13/205 |

OTHER PUBLICATIONS

Abrevaya, Victoria Fernández, Adnane Boukhayma, Philip HS Torr, and Edmond Boyer, "Cross-modal deep face normals with deactivable skip connections," In Proceedings of the IEEE/CVF Conference on Computer Vision and Pattern Recognition, pp. 4979-4989, 2020.

Baevski, Alexei, Henry Zhou, Abdelrahman Mohamed, and Michael Auli, "wav2vec 2.0: A Framework for Self-Supervised Learning of Speech Representations," arXiv preprint arXiv:2006.11477 Oct. 22, 2020.

Bailey, Stephen W., Dalton Omens, Paul Dilorenzo, and James F. O'brien, "Fast and deep facial deformations," ACM Transactions on Graphics (TOG) 39, No. 4: 94-1, Jul. 2020.

Bakker, Iris, Theo Van Der Voordt, Peter Vink, and Jan De Boon, "Pleasure, arousal, dominance: Mehrabian and Russell revisited," Current Psychology 33: 405-421, Jun. 11, 2014.

Benzeghiba, Mohamed, Renato De Mori, Olivier Deroo, Stephane Dupont, Teodora Erbes, Denis Jouvet, Luciano Fissore et al. "Automatic speech recognition and speech variability: A review," Speech communication 49, No. 10-11: 763-786, Feb. 6, 2007.

Bhat, Chitralekha, and Sunil Kopparapu, "Viseme comparison based on phonetic cues for varying speech accents," In Sixteenth Annual Conference of the International Speech Communication Association, Sep. 6, 2015.

Bishop, Chris M., "Training with noise is equivalent to Tikhonov regularization," Neural computation 7, No. 1: 108-116, 1995.

Botha, Johnny, and Heloise Pieterse, "Fake news and deepfakes: A dangerous threat for 21st century information security," In ICCWS 2020 15th International Conference on Cyber Warfare and Security, Academic Conferences and publishing limited, p. 57, 2020.

Brand, Matthew, "Voice puppetry," In Proceedings of the 26th annual conference on Computer graphics and interactive techniques, pp. 21-28, 1999.

Bregler, Christoph, Michele Covell, and Malcolm Slaney, "Video rewrite: Driving visual speech with audio," In Proceedings of the 24th annual conference on Computer graphics and interactive techniques, pp. 353-360, 1997.

Brown, Tom B., Benjamin Mann, Nick Ryder, Melanie Subbiah, Jared Kaplan, Prafulla Dhariwal, Arvind Neelakantan et al. "Language Models are Few-Shot Learners," arXiv preprint arXiv:2005.14165, Jul. 22, 2020.

Burgess, Christopher P., Irina Higgins, Arka Pal, Loic Matthey, Nick Watters, Guillaume Desjardins, and Alexander Lerchner, "Understanding disentangling in $\beta$-VAE," arXiv preprint arXiv:1804.03599, Apr. 10, 2018.

Busso, Carlos, Murtaza Bulut, Chi-Chun Lee, Abe Kazemzadeh, Emily Mower, Samuel Kim, Jeannette N. Chang, Sungbok Lee, and Shrikanth S. Narayanan, "IEMOCAP: Interactive emotional dyadic motion capture database," Language resources and evaluation 42: 335-359, Sep. 11, 2008.

Cao, Houwei, David G. Cooper, Michael K. Keutmann, Ruben C. Gur, Ani Nenkova, and Ragini Verma, "Crema-d: Crowd-sourced emotional multimodal actors dataset," IEEE transactions on affective computing 5, No. 4: 377-390, 2014.

Chai, Yujin, Yanlin Weng, Lvdi Wang, and Kun Zhou, "Speech-driven facial animation with spectral gathering and temporal attention," Frontiers of Computer Science 16: 1-10, Sep. 23, 2020.

Chen, Mingyi, Xuanji He, Jing Yang, and Han Zhang, "3-D convolutional recurrent neural networks with attention model for speech emotion recognition," IEEE Signal Processing Letters 25, No. 10: 1440-1444, Oct. 10, 2018.

Chung, Joon Son, Amir Jamaludin, and Andrew Zisserman, "You said that?," arXiv preprint arXiv:1705.02966, Jul. 18, 2017.

Chung, Joon Son, and Andrew Zisserman, "Lip reading in the wild," In Computer Vision—ACCV 2016: 13th Asian Conference on Computer Vision, Taipei, Taiwan, Nov. 20-24, 2016, Revised Selected Papers, Part II 13, pp. 87-103, Springer International Publishing, 2017.

Cootes, Timothy F., Gareth J. Edwards, and Christopher J. Taylor, "Active appearance models," IEEE Transactions on pattern analysis and machine intelligence 23, No. 6: 681-685, 2001.

Cudeiro, Daniel, Timo Bolkart, Cassidy Laidlaw, Anurag Ranjan, and Michael J. Black, "Capture, learning, and synthesis of 3D speaking styles," In Proceedings of the IEEE/CVF Conference on Computer Vision and Pattern Recognition, pp. 10101-10111, 2019.

Devlin, Jacob, Ming-Wei Chang, Kenton Lee, and Kristina Toutanova, "Bert: Pre-training of deep bidirectional transformers for language understanding," arXiv preprint arXiv:1810.04805, Oct. 11, 2018.

Diederik P. Kingma, , And Jimmy Ba, "ADAM: A Method for Stochastic Optimization," In 3rd International Conference on Learning Representations, ICLR 2015, San Diego, CA, USA, Conference Track Proceedings, May 7, 2015.

Doersch, Carl, "Tutorial on variational autoencoders," arXiv preprint arXiv:1606.05908, Aug. 13, 2016.

Dossou, Bonaventure FP, and Yeno KS Gbenou, "FSER: Deep Convolutional Neural Networks for Speech Emotion Recognition," arXiv preprint arXiv:2109.07916, 2021.

Ekman, Paul, "Facial expressions of emotion: an old controversy and new findings," Philosophical Transactions of the Royal Society of London. Series B: Biological Sciences 335, No. 1273: 63-69, 1992.

Engwall, Olov, and Jonas Beskow, "Resynthesis of 3D tongue movements from facial data," In Eighth European Conference on Speech Communication and Technology, 2003.

Ezzat, Tony, Gadi Geiger, and Tomaso Poggio, "Trainable videorealistic speech animation," ACM Transactions on Graphics (TOG) 21, No. 3: 388-398, Jun. 6, 2002.

Fabre, Diandra, Thomas Hueber, Laurent Girin, Xavier Alameda-Pineda, and Pierre Badin, "Automatic animation of an articulatory tongue model from ultrasound images of the vocal tract," Speech Communication 93: 63-75, Sep. 6, 2017.

FFX, FaceFX, URL: https://facefx.com/, Retrieved on: Sep. 3, 2021.

Gidaris, Spyros, Praveer Singh, and Nikos Komodakis, "Unsupervised representation learning by predicting image rotations," arXiv preprint arXiv:1803.07728, Mar. 21, 2018.

Hahn, Fabian, Bernhard Thomaszewski, Stelian Coros, Robert W. Sumner, and Markus Gross, "Efficient simulation of secondary motion in rig-space," In Proceedings of the 12th ACM SIGGRAPH/eurographics symposium on computer animation, pp. 165-171, 2013.

Hahn, Fabian, Sebastian Martin, Bernhard Thomaszewski, Robert Sumner, Stelian Coros, and Markus Gross, "Rig-space physics." ACM transactions on graphics (TOG) 31, No. 4: 1-8, 2012.

Han, Kun, Dong Yu, and Ivan Tashev, "Speech emotion recognition using deep neural network and extreme learning machine," In Interspeech, 2014.

Hannun, Awni, Carl Case, Jared Casper, Bryan Catanzaro, Greg Diamos, Erich Elsen, Ryan Prenger et al., "Deep speech: Scaling up end-to-end speech recognition," arXiv preprint arXiv:1412.5567, Dec. 19, 2014.

Higgins, Irina, Loic Matthey, Arka Pal, Christopher Burgess, Xavier Glorot, Matthew Botvinick, Shakir Mohamed, and Alexander Lerchner, "beta-vae: Learning basic visual concepts with a constrained variational framework," In International conference on learning representations, 2017.

Holden, Daniel, Jun Saito, and Taku Komura, "Learning inverse rig mappings by nonlinear regression," IEEE transactions on visualization and computer graphics 23, No. 3: 1167-1178, 2016.

Huang, Xuedong, and Kai-Fu Lee, "On speaker-independent, speaker-dependent, and speaker-adaptive speech recognition," IEEE Transactions on Speech and Audio processing 1, No. 2: 150-157, Apr. 1993.

James, Jesin, Li Tian, and Catherine Watson, "An open source emotional speech corpus for human robot interaction applications," Interspeech, Sep. 6, 2018.

(56) References Cited

OTHER PUBLICATIONS

Jonell, Patrik, Taras Kucherenko, Gustav Eje Henter, and Jonas Beskow, "Let's face it: Probabilistic multi-modal interlocutor-aware generation of facial gestures in dyadic settings," In Proceedings of the 20th ACM International Conference on Intelligent Virtual Agents, pp. 1-8, Oct. 22, 2020.

Karras, Tero, Miika Aittala, Samuli Laine, Erik Härkönen, Janne Hellsten, Jaakko Lehtinen, and Timo Aila, "Alias-Free Generative Adversarial Networks," arXiv preprint arXiv:2106.12423, Mar. 13, 2021.

Karras, Tero, Samuli Laine, and Timo Aila, "A style-based generator architecture for generative adversarial networks," In Proceedings of the IEEE/CVF conference on computer vision and pattern recognition, pp. 4401-4410, 2019.

Karras, Tero, Samuli Laine, Miika Aittala, Janne Hellsten, Jaakko Lehtinen, and Timo Aila, "Analyzing and Improving the Image Quality of StyleGAN," In 2020 IEEE/CVF Conference on Computer Vision and Pattern Recognition (CVPR), pp. 8107-8116, IEEE Computer Society, 2020.

Karras, Tero, Timo Aila, Samuli Laine, Antti Herva, and Jaakko Lehtinen, "Audio-driven facial animation by joint end-to-end learning of pose and emotion," ACM Transactions on Graphics (TOG) 36, No. 4: 1-12, 2017.

Kingma, D. P., and M. Welling, "Auto-encoding variational Bayes. 2nd international conference on learning representations (ICLR2014)," Preprint, submitted Dec. 23, 2014: arXiv: http://arxiv.org/abs/1312.6114v10, May 1, 2014.

Kingma, Diederik P., and Max Welling, "Auto-encoding variational bayes," arXiv preprint arXiv:1312.6114, Dec. 20, 2013.

Korn, Oliver, Lukas Stamm, and Gerd Moeckl, "Designing authentic emotions for non-human characters: A study evaluating virtual affective behavior," In Proceedings of the 2017 conference on designing interactive systems, pp. 477-487, Jun. 10, 2017.

Lewis, John P., and Ken-Ichi Anjyo, "Direct manipulation blendshapes," IEEE Computer Graphics and Applications 30, No. 4: 42-50, Jul. 2010.

Lewis, John P., Ken Anjyo, Taehyun Rhee, Mengjie Zhang, Frederic H. Pighin, and Zhigang Deng, "Practice and theory of blendshape facial models," Eurographics (State of the Art Reports) 1, No. 8: 2, 2014.

Li, Zhi, Anne Aaron, Ioannis Katsavounidis, Anush Moorthy, and Megha Manohara, "Toward a practical perceptual video quality metric," The Netflix Tech Blog 6, No. 2: 2, Jun. 6, 2016.

Lin, Ji, Richard Zhang, Frieder Ganz, Song Han, and Jun-Yan Zhu, "Anycost gans for interactive image synthesis and editing," In Proceedings of the IEEE/CVF Conference on Computer Vision and Pattern Recognition, pp. 14986-14996, 2021.

Livingstone, Steven R., and Frank A. Russo, "The Ryerson Audio-Visual Database of Emotional Speech and Song (RAVDESS): A dynamic, multimodal set of facial and vocal expressions in North American English," PloS one 13, No. 5: e0196391, May 16, 2018.

Luo, Changwei, Jun Yu, Xian Li, and Leilei Zhang, "HMM based speech-driven 3D tongue animation," In 2017 IEEE International Conference On Image Processing (ICIP), pp. 4377-4381, IEEE, Sep. 2017.

News, Guinness World Records. Star Wars: The Old Republic Recognised Guinness World Records 2012 Gamer's Edition, URL: https://www.guinnessworldrecords.com, Retrieved on: Dec. 17, 2021.

Nwe, Tin Lay, Say Wei Foo, and Liyanage C. De Silva, "Speech emotion recognition using hidden Markov models," Speech communication 41, No. 4: 603-623, Nov. 2003.

Orvalho, Verónica, Pedro Bastos, Frederic I. Parke, Bruno Oliveira, and Xenxo Alvarez, "A Facial Rigging Survey," Eurographics (State of the Art Reports): 183-204, 2012.

Paszke, Adam, Sam Gross, Francisco Massa, Adam Lerer, James Bradbury, Gregory Chanan, Trevor Killeen et al, "Pytorch: An imperative style, high-performance deep learning library," Advances in neural information processing systems 32, 2019.

Patamia, Rutherford Agbeshi, Wu Jin, Kingsley Nketia Acheampong, Kwabena Sarpong, and Edwin Kwadwo Tenagyei, "Transformer based multimodal speech emotion recognition with improved neural networks," In 2021 IEEE 2nd International Conference on Pattern Recognition and Machine Learning (PRML), pp. 195-203, IEEE, 2021.

Pelachaud, Catherine, Cornelius Wam Van Overveld, and Chin Seah, "Modeling and animating the human tongue during speech production," In Proceedings of Computer Animation'94, pp. 40-49. IEEE, May 1994.

Pham, Hai Xuan, Yuting Wang, and Vladimir Pavlovic, "End-to-end learning for 3d facial animation from speech," In Proceedings of the 20th ACM International Conference on Multimodal Interaction, pp. 361-365, 2018.

Richard, Alexander, Colin Lea, Shugao Ma, Jurgen Gall, Fernando De La Torre, and Yaser Sheikh, "Audio-and gaze-driven facial animation of codec avatars," In Proceedings of the IEEE/CVF winter conference on applications of computer vision, pp. 41-50, 2021.

Richard, Alexander, Michael Zollhoefer, Yandong Wen, Fernando De La Torre, and Yaser Sheikh, "MeshTalk: 3D Face Animation from Speech using Cross-Modality Disentanglement," arXiv preprint arXiv:2104.08223, Apr. 16, 2021.

Schneider, Steffen, Alexei Baevski, Ronan Collobert, and Michael Auli, "wav2vec: Unsupervised pre-training for speech recognition," arXiv preprint arXiv:1904.05862, Sep. 11, 2019.

Schwartz, Roy, Jesse Dodge, Noah A. Smith, and Oren Etzioni, "Green AI," arXiv preprint arXiv:1907.10597, Aug. 13, 2019.

SG, Speech Graphics, URL: https://www.speech-graphics.com/, Retrieved on: Sep. 3, 2021.

Si, Shijing, Jianzong Wang, Xiaoyang Qu, Ning Cheng, Wenqi Wei, Xinghua Zhu, and Jing Xiao, "Speech2video: Cross-modal distillation for speech to video generation," arXiv preprint arXiv:2107.04806, Jul. 10, 2021.

Sohn, Kihyuk, Honglak Lee, and Xinchen Yan, "Learning structured output representation using deep conditional generative models," Advances in neural information processing systems 28, 2015.

Taylor, Sarah, Taehwan Kim, Yisong Yue, Moshe Mahler, James Krahe, Anastasio Garcia Rodriguez, Jessica Hodgins, and Iain Matthews, "A deep learning approach for generalized speech animation," ACM Transactions On Graphics (TOG) 36, No. 4: 1-11, Jul. 2017.

Theis, Lucas, Aäron Van Den Oord, and Matthias Bethge, "A note on the evaluation of generative models," arXiv preprint arXiv:1511.01844, Nov. 5, 2015.

Tzirakis, Panagiotis, Athanasios Papaioannou, Alexandros Lattas, Michail Tarasiou, Björn Schuller, and Stefanos Zafeiriou, "Synthesising 3D facial motion from "in-the-wild" speech," In 2020 15th IEEE International Conference on Automatic Face and Gesture Recognition (FG 2020), pp. 265-272, IEEE, Apr. 15, 2019.

Vaessen, Nik, and David A. Van Leeuwen, "Fine-tuning wav2vec2 for speaker recognition," arXiv preprint arXiv:2109.15053, Sep. 30, 2021.

Verma, Ashish, Nitendra Rajput, and L. Venkata Subramaniam, "Using viseme based acoustic models for speech driven lip synthesis," In 2003 IEEE International Conference on Acoustics, Speech, and Signal Processing, 2003, Proceedings.(ICASSP'03)., vol. 5, pp. V-720, IEEE, Apr. 6, 2003.

Wang, Chengyi, Yu Wu, Sanyuan Chen, Shujie Liu, Jinyu Li, Yao Qian, and Zhenglu Yang, "Self-supervised learning for speech recognition with intermediate layer supervision," arXiv preprint arXiv:2112.08778, Dec. 16, 2021.

Yang, Lin, Yi Shen, Yue Mao, and Longjun Cai, "Hybrid Curriculum Learning for Emotion Recognition in Conversation," arXiv preprint arXiv:2112.11718 Dec. 22, 2021.

Yannakakis, Georgios N., Roddy Cowie, and Carlos Busso, "The ordinal nature of emotions: An emerging approach," IEEE Transactions on Affective Computing 12, No. 1: 16-35, 2018.

Zachary C. Lipton, and Subarna Tripathi, "Precise Recovery of Latent Vectors from Generative Adversarial Networks", 5th International Conference on Learning Representations, ICLR 2017, Toulon, France, Apr. 24-26, 2017, Workshop Track Proceedings, Open-Review.net, Apr. 24, 2017.

(56) References Cited

OTHER PUBLICATIONS

Zhang, Yuanyuan, Jun Du, Zirui Wang, and Jianshu Zhang, "Attention Based Fully Convolutional Network for Speech Emotion Recognition," arXiv preprint arXiv:1806.01506, Jun. 5, 2018.

Zhou, Yang, Zhan Xu, Chris Landreth, Evangelos Kalogerakis, Subhransu Maji, and Karan Singh, "Visemenet: Audio-driven animator-centric speech animation," ACM Transactions on Graphics (TOG) 37, No. 4: 1-10, Aug. 2018.

Zhou, Yang, Zhan Xu, Chris Landreth, Evangelos Kalogerakis, Subhransu Maji, and Karan Singh, "VisemeNet: Audio-Driven Animator-Centric Speech Animation," arXiv preprint arXiv:1805.09488, May 24, 2018.

Zhu, Lixing, Gabriele Pergola, Lin Gui, Deyu Zhou, and Yulan He, "Topic-Driven and Knowledge-Aware Transformer for Dialogue Emotion Detection," In Proceedings of the 59th Annual Meeting of the Association for Computational Linguistics and the 11th International Joint Conference on Natural Language Processing (vol. 1: Long Papers), pp. 1571-1582, Aug. 1, 2021.

Abdelaziz, Ahmed Hussen, et al., "Audiovisual Speech Synthesis using Tacotron2," arXiv preprint arXiv:2008.00620 Aug. 3, 2020.

Peng, Ziqiao, et al., "EmoTalk: Speech-driven emotional disentanglement for 3D face animation," arXiv preprint arXiv:2303.11089, Mar. 20, 2023.

Eskimez, Sefik Emre, et al., "Speech driven talking face generation from a single image and an emotion condition," IEEE Transactions on Multimedia 24: 3480-3490 Jul. 21, 2021.

Wang, Kaisiyuan, et al., "Mead: A large-scale audio-visual dataset for emotional talking-face generation." Computer Vision—ECCV 2020: 16th European Conference, Glasgow, UK, Aug. 23-28, 2020, Proceedings, Part XXI. Cham: Springer International Publishing, Aug. 23, 2020.

Zeng, Dan et al., "Talking face generation with expression-tailored generative adversarial network," Proceedings of the 28th ACM International Conference on Multimedia, Supplemental Material Video Retrieved from: https://dl.acm.org/doi/10.1145/3394171.3413844, dated 2020.

Sadiq, Rizwan, et al., "Emotion Dependent Facial Animation from Affective Speech." 2020 IEEE 22nd International Workshop on Multimedia Signal Processing (MMSP). IEEE, 2020.

Bolduc, Maquis et al., "Rig Inversion by Training a Differentiable Rig Function," SIGGRAPH Asia 2022 Technical Communications, 1-4 2022.

Medina, Salvador, et al., Speech Driven Tongue Animations, Proceedings of the IEEE/CVF Conference on Computer Vision and Pattern Recognition (CVPR), 2022.

Fan, Yingruo, et al., "Faceformer: Speech-driven 3d facial animation with transformers," Proceedings of the IEEE/CVF Conference on Computer Vision and Pattern Recognition, 2022.

Bao, Linchao et al., "Learning Audio-Driven Viseme Dynamics for 3D Face Animation," arXiv preprint arXiv:2301.06059, Jan. 15, 2023.

Tarantino, L., et al., Self-Attention for Speech Emotion Recognition. Proc. Interspeech 2019, 2578-2582, doi: 10.21437/Interspeech.2019-2822, Sep. 15, 2019.

Li, Y., et al., ) Improved End-to-End Speech Emotion Recognition Using Self Attention Mechanism and Multitask Learning. Proc. Interspeech 2019, 2803-2807, doi: 10.21437/Interspeech.2019-2594, Sep. 15, 2019.

Jali, Jali Research Inc., URL: http://jaliresearch.com, 5 pages, visited on Sep. 9, 2021.

Lithgow, K. and Edge, J, "Surrey AudioVisual Expressed Emotion (SAVEE) Database," URL: http://kahlan.eps.surrey.ac.uk/savee/. 7 pages, Apr. 2, 2015.

NVIDIA, Omniverse Audio 2Face, https://www.nvidia.com/en-us/omiverse/apps/audio2face/, 1 page, Retrieved on: May 22, 2023.

Speech Graphics, SGX, https://www.speech-graphics.com/sgx-production-audio-to-face-animation-software/; 2pages, Retrieved on: May 22, 2023.

* cited by examiner

GENERATING FACIAL ANIMATION DATA FROM SPEECH AUDIO

BACKGROUND

The provision of facial animations is an important part of video game development. It may be desirable to provide improved systems and methods for generating facial animations from speech audio.

SUMMARY

In accordance with a first aspect, this specification provides a system comprising: or more computing devices; and one or more storage devices communicatively coupled to the one or more computing devices. The one or more storage devices store instructions that, when executed by the one or more computing devices, cause the one or more computing devices to perform operations comprising: receiving input data derived from speech audio; generating facial animation data, comprising processing the input data and a conditioning input using a machine-learned generative model; generating further animation data, comprising processing the input data using a further machine-learned generative model; and generating animation data for at least a face in a video game using the facial animation data and the further animation data, wherein the animation data animates at least the face in the video game in accordance with speech sounds of the speech audio.

The further animation data may comprise tongue animation data that animates a tongue for the face in the video game.

The input data derived from the speech audio may comprise acoustic features determined from the speech audio. Additionally or alternatively, the input data derived from the speech audio may comprise outputs generated by one or more neural network layers of a neural network model that has been trained to perform speech transcription. The outputs may be generated by processing the speech audio using the neural network model.

At least one of the machine-learned generative model or the further machine-learned generative model may comprise at least one of: a decoder of a conditional variational autoencoder; a generator neural network of a conditional generative adversarial neural network; a conditional flow-based model; or a conditional denoising diffusion model.

In accordance with a second aspect, this specification provides one or more non-transitory computer storage media storing instructions that when executed by one or more computing devices cause the one or more computing devices to perform operations comprising: processing, using a machine-learned generative model: (i) an initial conditioning input, and (ii) data derived from speech audio of one or more speech animation examples associated with a particular facial expression, wherein each speech animation example comprises the data derived from the speech audio and corresponding ground-truth facial animation data; generating, as output of the machine-learned generative model, predicted facial animation data for each speech animation example; and generating the conditioning input representing the particular facial expression, comprising: determining a loss for each speech animation example, wherein the loss of a speech animation example is dependent on the predicted facial animation data and the ground-truth facial animation data of the training example; and updating the initial conditioning input based on the losses of the speech animation examples.

The operations may further comprise generating facial animation data that animates a face in a video game in accordance with speech sounds of speech audio and the selected facial expression, comprising: receiving the conditioning input associated with the selected facial expression; and generating the facial animation data, comprising processing the conditioning input and input data derived from the speech audio using the machine-learned generative model.

Generating the conditioning input may comprise: freezing weights of the machine-learned generative model; and updating the initial conditioning input using a gradient-based optimization procedure and the losses of the speech animation examples.

Determining the loss of a speech animation example may comprise performing a comparison between the predicted facial animation data and the ground-truth facial animation data of the speech animation example.

The one or more speech animation examples may comprise a plurality of speech animation examples generated using speech audio associated with a plurality of speakers.

In accordance with a third aspect, this specification provides a computer-implemented method for generating facial animation data. The facial animation data animates a face in a video game in accordance with speech sounds of speech audio, and comprises rig parameters for a facial animation rig. The method comprises: generating mesh data for a facial mesh, comprising processing input data derived from the speech audio and a conditioning input using a machine-learned generative model; and generating the facial animation data comprising the rig parameters, comprising processing the mesh data using a machine-learned mesh-to-rig model.

The machine-learned mesh-to-rig model may comprise a neural network.

The method may further comprise generating tongue animation data, wherein the tongue animation data comprises rig parameters for a tongue animation rig, the tongue animation data generated by: generating mesh data for a tongue mesh, comprising processing the input data derived from the speech audio using a further machine-learned generative model; and generating the tongue animation data comprising the rig parameters, comprising processing the mesh data for the tongue mesh using a further machine-learned mesh-to-rig model.

The method may further comprise generating, using the facial animation data and the tongue animation data, animation data that animates at least the face in the video game.

The machine-learned generative model may comprise at least one of: a decoder of a conditional variational autoencoder; a generator neural network of a conditional generative adversarial neural network; a conditional flow-based model; or a conditional denoising diffusion model.

In accordance with a fourth aspect, this specification provides a system comprising: or more computing devices; and one or more storage devices communicatively coupled to the one or more computing devices. The one or more storage devices store instructions that, when executed by the one or more computing devices, cause the one or more computing devices to perform operations comprising: generating input data derived from speech audio, comprising: processing the speech audio using a neural network model that has been trained to perform a speech processing task; and providing the input data from outputs generated by one or more neural network layers of the neural network model; and generating facial animation data that animates a face in a video game in accordance with speech sounds of the speech audio, comprising processing the input data derived from the speech audio and a conditioning input using a machine-learned generative model.

The neural network model may have been trained to perform speech transcription.

The facial animation data may comprise mesh data for a facial mesh. Additionally or alternatively, the facial animation data may comprise rig parameters for a facial animation rig. The rig parameters for the facial animation rig may be generated by: generating, as output of the machine-learned generative model, mesh data for a facial mesh; and generating the rig parameters for the facial animation rig, comprising processing the mesh data using a machine-learned mesh-to-rig model.

DESCRIPTION

General Definitions

Figure 1:
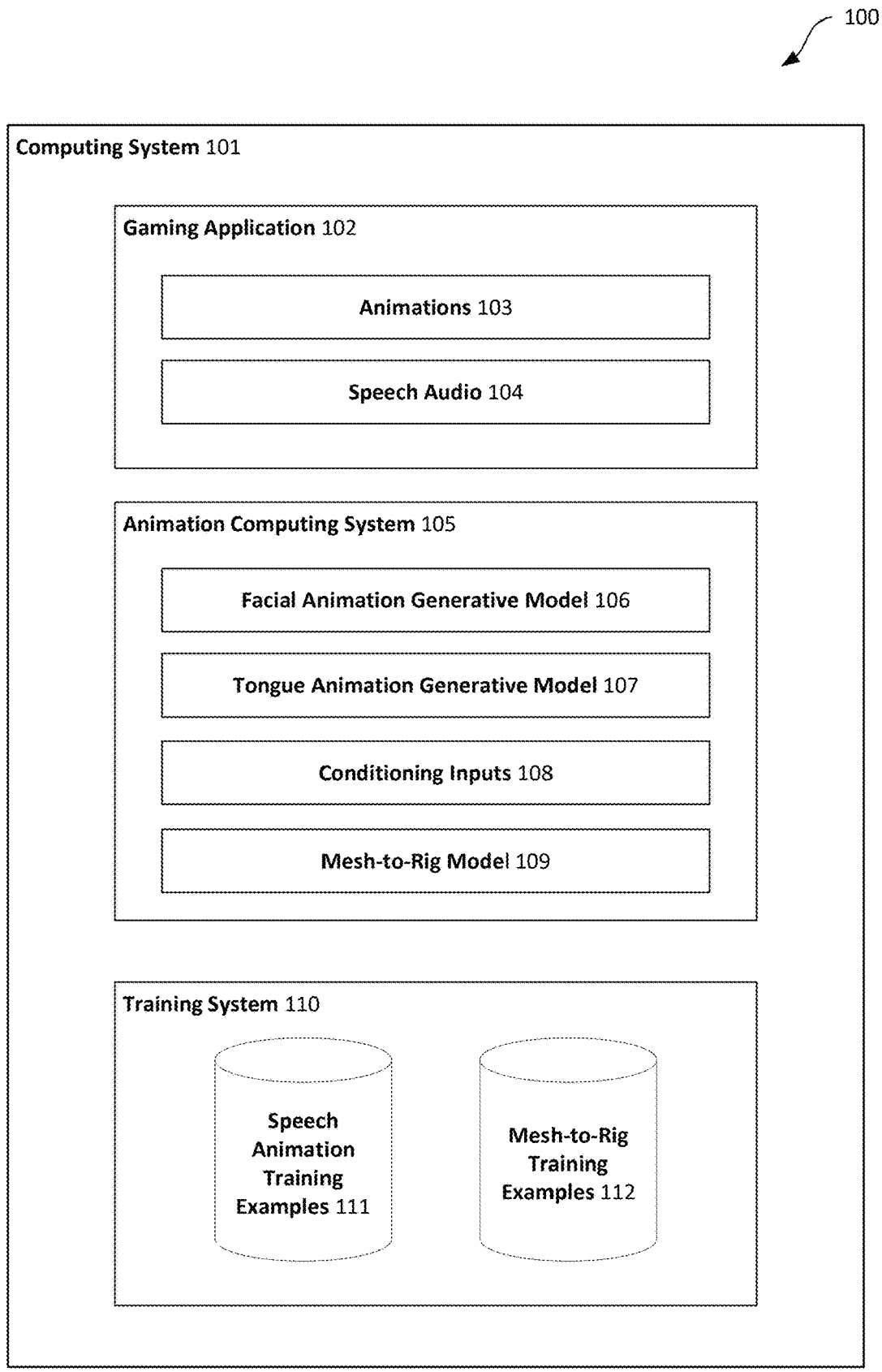
FIG. 1 is a schematic block diagram illustrating an example of a computing system configured to generate animation generative models.

The following terms are defined to aid the present disclosure and not limit the scope thereof.

A "user" or "player", as used in some embodiments herein, refers to an individual and/or the computing system(s) or device(s) corresponding to (e.g., associated with, operated by) that individual.

A "video game", as used in some embodiments described herein, is a virtual interactive environment in which players engage. Video game environments may be facilitated through a client-server framework in which a client may connect with the server to access at least some of the content and functionality of the video game.

"Speech" as used in some embodiments described herein may include sounds in the form of spoken words in any language, whether real or invented and/or other utterances including paralinguistics such as sighs, yawns, moans etc. "Speech audio" refers to audio (e.g. audio data) which includes or represents speech, and may comprise data in any suitable audio file format whether in a compressed or uncompressed format.

"Acoustic features" as used in some embodiments described herein may include any suitable acoustic representation of frequency, magnitude and/or phase information of speech audio. For example, acoustic features may comprise linear spectrograms, log-mel-spectrograms, linear predictive coding (LPC) coefficients, Mel-Frequency Cepstral Coefficients (MFCC), Spectral Subband Centroids (SSC), log fundamental frequency (LFO), band aperiodicity (bap) or combinations thereof.

"Text" as used in some embodiments described herein refers to any suitable representation of characters, words or symbols that may be used to represent language and/or speech.

A "mesh", as used in some embodiments described herein, is a collection of vertices and/or edges and/or other elements that describes the shape of an object, or part of an object, in a video game. A mesh may be a polygon mesh, such as a triangle mesh, wherein vertices are arranged in polygons to form the surface of the shape.

"Mesh data", as used in some embodiments described herein is data defining a configuration (e.g. the 3D shape) of at least part of a mesh. Mesh data may for example specify the position of elements of the mesh such as vertices and/or edges. In some examples, mesh data may define the configuration (e.g. shape) of a mesh by specifying a deformation or transformation from a default/neutral mesh configuration.

"Rigging", as used in some embodiments described herein, is a technique that provides controls for animating a video game object. An animation rig (also referred to herein as simply a "rig") may be provided which defines the logic (e.g. a set of rules) by which the controls (also referred to herein as "rig parameters") are transformed into mesh data for the video game object. A rig may be skeletal-based, wherein the controls define the configuration (e.g. rotation) of various joints of a skeleton, and the mesh is generated/deformed based on the configuration of the joints. Additionally or alternatively, the rig may be based on blend shapes (or any other suitable set of basis shapes) that define modifications of the mesh (e.g. from a default/neutral configuration of the mesh), wherein the controls define how different blend shapes are combined. A weight may be determined for each of the blend shapes from the controls, and the mesh may be generated using the blend shapes and their respective weights.

This specification describes systems and methods for generating animations (e.g. facial animations and tongue animations) from speech audio using machine-learned generative models. The systems and methods described herein can be used to generate animations automatically with improved quality (e.g. improved realism when viewed while hearing the corresponding speech audio) with respect to other automatic methods, while also allowing editability over the generated animations. For example, animations can be generated according to a desired facial expression, and fine-grained control of the generated animations can be provided by the generation of rig parameters for an animation rig, which parameters can be easily modified by animators. The generated animation data may be generated for a generic target head, which can be easily adapted to generate animation data for more specific (e.g. personalized) target heads.

In some implementations, animations can be generated using outputs generated from both of a facial animation generative model and a tongue animation generative model. The facial animation generative model may generate facial animation data that can be used to animate facial elements (e.g. lips, eyes, eyebrows, cheeks, etc.) of a face, and the tongue animation generative model may generate tongue animation data that can be used to animate a tongue for the face. Animation data that animates at least a face in a video game can be generated using a combination of the facial animation data and the tongue animation data, which can be used to generate animations for the head with improved quality over animations without tongue. This can be important in some situations, as it is sometimes not possible for a viewer of a speech animation to distinguish between different phonemes based on solely the lip shapes for the phonemes. Thus, by accurately representing the tongue shape/pose in generated animations, the described systems and methods can be used to generate animations that are more appropriate and realistic for speech audio.

The animation generative models provided by the described systems and methods allow the speech-driven and speech-agnostic components of animations to be decoupled. This can be achieved by training the animation generative models to operate on conditioning inputs representing face/tongue poses wherein the conditioning inputs are based on windows of speech audio. For example, during training of the animation generative models, a latent space may be learned wherein the latent space learns distributions of plausible poses for given windows of speech audio. A latent vector sampled from the learned latent space can be provided as a conditioning input for the animation generative model that can be used to represent speech-agnostic characteristics of the animation (e.g. facial expression).

In some implementations, after training of the animation generative models, a conditioning input representing a particular facial expression can be determined by an optimization process (e.g. latent optimization). For example, a number of speech animation examples corresponding to a particular facial expression/speech style (e.g. angry, happy, sad, etc.) can be selected, wherein the animation data of each selected example corresponds to the speech style (e.g. by portraying an angry facial expression for an angry speech style). Speech audio of the selected speech animation examples can be processed by the animation generative models along with an initial conditioning input to generate predicted animation data. An updated conditioning input corresponding to the particular facial expression can be obtained by updating the initial conditioning input using the predicted animation data and corresponding animation data of the selected examples. An updated conditioning input can be associated with each facial expression of a set of different facial expressions and can be provided as input to the animation generative models in response to a user selecting a particular facial expression. In this way, the described systems and methods can provide user control over the overall expression of generated animations.

In some implementations, the described systems and methods make use of a machine-learned mesh-to-rig models which transform mesh data into rig parameters. For example, the animation generative models may generate mesh data as output which can be converted into rig parameters using the machine-learned mesh-to-rig model. By providing rig parameters as animation data, artists and animators can more easily control and fine-tune animations using a starting point of realistic animations for selected speech audio, wherein the initial animations are generated using the determined rig parameters. Furthermore, configuring the animation generative models to generate mesh data which is subsequently converted into rig parameters by a separate machine-learned mesh-to-rig model may provide more appropriate rig parameters for animations than those determined when configuring the animation generative models to directly generate predicted rig parameters.

In some implementations, the animation generative models described herein receive speech audio as input and generate animation data as output. By avoiding processing phoneme-based representations, loss of audio information in speech audio can be prevented, and the quality (e.g. realism) of the generated animations can be improved, for example in relation to generating animations for non-verbal sounds. Additionally or alternatively, the animation generative models may operate on representations of speech audio that combine audio representations and language representations. For example, speech audio may be processed by a speech processing neural network (e.g. a speech transcription neural network), and outputs of one or more neural network layers of the speech processing neural network may be provided to the animation generative models as input. In another example, the animation generative models may operate on only language-dependent representations of the speech audio (e.g. text data representing the speech sounds of the speech audio).

General Overview

FIG. 1 is a schematic block diagram illustrating an example 100 of a computing system 101 configured to generate animation generative models 106, 107. The facial animation generative model 106 receives speech audio data representing speech audio 104 (or data derived therefrom) and one or more conditioning inputs 108, and generates facial animation data for animating a face in a video game. The tongue animation generative model 107 receives speech audio data representing speech audio 104 (or data derived therefrom) and one or more conditioning inputs 108, and generates tongue animation data for animating a tongue in a video game. Any of the functionality described as being performed by a specific component of the system 101 may instead be performed across a number of components, and/or functionality described as being performed by multiple components may be performed on a single component.

The computing system 101 includes gaming application 102 configured to provide a video game. Gaming application 102 includes a game engine (not displayed). The game engine can be configured to execute aspects of the operation of the gaming application 102 according to game rules. Examples of game rules can include rules for scoring, possible inputs, actions/events, movement in response to inputs, and the like. The game engine may receive inputs (provided by a user and/or by other components of the system 101) and determine in-game events, such as actions, jumps, runs, throws, attacks, and other events appropriate for the gaming application 102. During runtime operation, the game engine can read user inputs, in-game data, and game state information to determine the appropriate in-game events. This can include causing one or more animations 103 stored as part of the gaming application 102 to be rendered and displayed, along with causing output of corresponding speech audio 104 for the one or more animations 103.

The animations 103 provide a sequence of video frames displaying at least a face for the video game. The animations 103 may be stored in any appropriate format. For example, the animations 103 may be stored as mesh data, texture data, pixel data, and/or compressed representations thereof. Mesh data may specify the positions of a collection of vertices in a 3D space. For example, the collection of vertices may represent the shape of a face (e.g. the face pose) by a facial mesh and/or represent the shape of a tongue (e.g. the tongue pose) by a tongue mesh. Texture data may specify the surface appearance of a face/tongue that may be represented by a mesh. Texture data may be stored in the form of an image. Pixel data may specify color and/or light intensity values for each pixel of a video frame that is rendered for display by the gaming application 102. Additionally or alternatively, rig parameters for an animation rig (e.g. a facial animation rig and/or a tongue animation rig) may be used to store the animations 103.

Speech audio 104 provides a sequence of speech audio frames for outputting speech in the video game. The speech audio 104 may be stored in any appropriate format, e.g. as a waveform and/or in a compressed format, etc. At least some speech audio 104 (e.g. one or more stored speech audio files) is associated with a respective animation 103 in that the gaming application 102 causes the speech audio 104 to be outputted together with display of the associated animation 103 at some point in playthrough of the video game The computing system 101 includes an animation system 105 that is used/accessed by animators to produce animations 103 for the gaming application 102. The animation system 105 typically includes an animation application (not displayed) that provides a graphical user interface for animators to interact with when producing animations 103 for speech audio 104.

The animation computing system 105 includes a facial animation generative model 106, a tongue animation generative model 107, conditioning inputs 108, and mesh-to-rig model(s) 109.

The facial animation generative model 106 is configured to receive the speech audio data (or data derived therefrom) and one or more conditioning inputs 108, and generate facial animation data. The speech audio data may comprise a waveform of speech audio. Additionally or alternatively, the speech audio data may comprise a compressed representation of the speech audio. For example, the speech audio data may comprise acoustic features comprising a representation of frequency, magnitude and/or phase information of the speech audio such as linear spectrograms, log-mel-spectrograms, linear predictive coding (LPC) coefficients, Mel-Frequency Cepstral Coefficients (MFCC), Spectral Subband Centroids (SSC), log fundamental frequency (LFO), band aperiodicity (bap) or combinations thereof. The speech audio data may comprise a plurality of time steps and associated data for each time step, e.g. acoustic features and/or amplitudes for each of the plurality of time steps. For example, the speech audio data may comprise acoustic features and/or amplitudes for each of the plurality of time steps.

Speech audio data may be processed prior to being received by the facial animation generative model 106. For example, a speech processing neural network may first process the speech audio data as will be described in greater detail in relation to FIG. 9. Outputs generated by one or more neural network layers of the speech processing neural network from processing the speech audio data may be received by the facial animation generative model 106. The speech processing neural network may be a speech transcription neural network that has been trained to predict the speech content of speech audio. This can be used to provide representations that represent aspects of both the speech sounds and the speech content of the speech audio. For example, outputs generated by an intermediate neural network layer (e.g. a neural network layer preceding an output layer) of the speech transcription neural network may be provided to the facial animation generative model 106. Additionally or alternatively, outputs generated by an output layer of the speech transcription neural network can be provided to the facial animation generative model 106. Outputs can be generated by one or more neural network layers of the speech processing neural network for each time step of the speech audio data, and the outputs of each time step can be provided to the facial animation generative model 106.

The facial animation generative model 106 comprises a generative machine-learned model that has been trained to generate facial animation data from speech audio data. The facial animation generative model 106 is trained using training system 110 and speech animation training examples 111. The facial animation generative model 106 may comprise a neural network comprising a plurality of neural network layers. The neural network layers may comprise feedforward layers, e.g. fully connected layers and/or convolutional layers. Additionally or alternatively, the neural network layers may comprise recurrent layers, e.g. LSTM layers and/or bidirectional LSTM layers. Additionally or alternatively, the neural network may comprise one or more Transformer encoder and/or decoder blocks.

The facial animation generative model 106 may comprise any suitable conditional generative model. For example, the facial animation generative model 106 may comprise one or more of: a decoder of a conditional variational autoencoder; a generator neural network of a conditional generative adversarial neural network; a conditional flow-based model, which is optionally a conditional normalizing flow model; and a conditional denoising diffusion model.

The facial animation generative model 106 can be used to generate facial animation data that animates various facial elements (e.g. eyes, noses, cheeks, etc.). Additionally, animation generative models can be provided that animates a particular element belonging to the head, such as a tongue animation generative model 107 that generates tongue animation data for animating a tongue.

The tongue animation generative model 107 comprises a similar generative machine-learned model to the facial animation generative model 106. The tongue animation generative model 107 comprises a generative machine-learned model that has been trained to generate tongue animation data from speech audio data. The tongue animation generative model 107 is trained using training system 110 and speech animation training examples 111. The tongue animation generative model 107 may comprise a neural network comprising a plurality of neural network layers. The neural network layers may comprise feedforward layers, e.g. fully connected layers and/or convolutional layers. Additionally or alternatively, the neural network layers may comprise recurrent layers, e.g. LSTM layers and/or bidirectional LSTM layers. Additionally or alternatively, the neural network may comprise one or more Transformer encoder and/or decoder blocks.

The tongue animation generative model 107 may comprise any suitable conditional generative model. For example, the tongue animation generative model 107 may comprise one or more of: a decoder of a conditional variational autoencoder; a generator neural network of a conditional generative adversarial neural network; a conditional flow-based model, which is optionally a conditional normalizing flow model; and a conditional denoising diffusion model.

Figure 5:
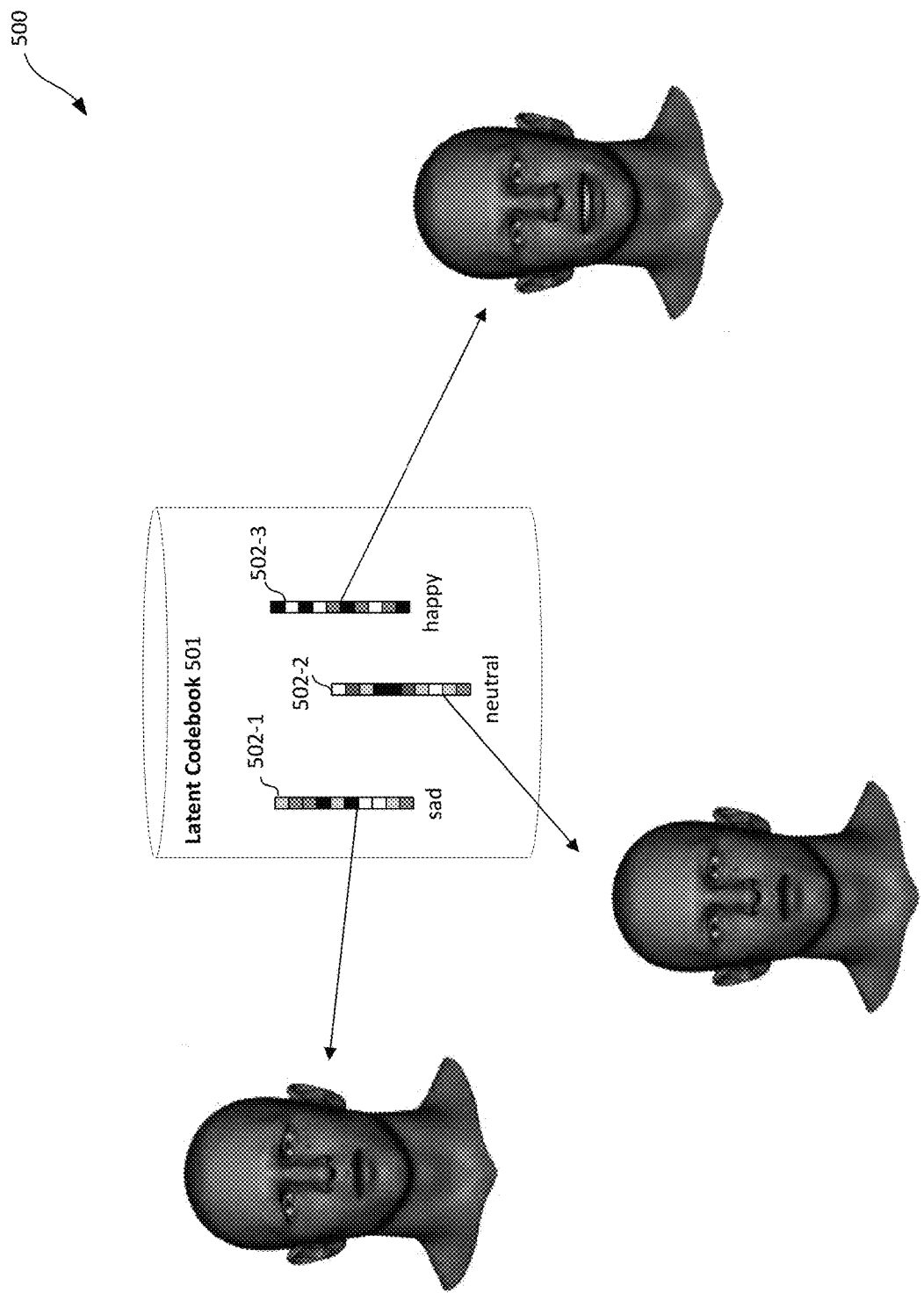
FIG. 5 illustrates example conditioning inputs for use in conditioning an animation generative model.

The animation computing system 105 is configured to store conditioning inputs 108 that have been determined to correspond to particular facial expressions when applied as input to the animation generative models 106, 107. For example, FIG. 5 illustrates an example latent codebook storing latent vectors associated with different speech emotions. An example method of determining such conditioning inputs is described in greater detail in relation to FIG. 6.

In some implementations, the animation generative models 106, 107 may generate animation data comprising mesh data. Mesh data can be transformed into corresponding rig parameters for an animation rig using mesh-to-rig models 109. For example, rig parameters for a facial animation rig can be generated using mesh-to-rig models 109. As another example, rig parameters for a tongue animation rig can be generated using mesh-to-rig models 109. An example method of using mesh-to-rig models 109 to transform mesh data into rig parameters is described in greater detail in relation to FIG. 7. Mesh-to-rig models 109 are trained using training system 110 and mesh-to-rig training examples 112. An example method of training mesh-to-rig models is described in greater detail in relation to FIG. 8.

Example Conditional Variational Autoencoder Training Method

Figure 2:
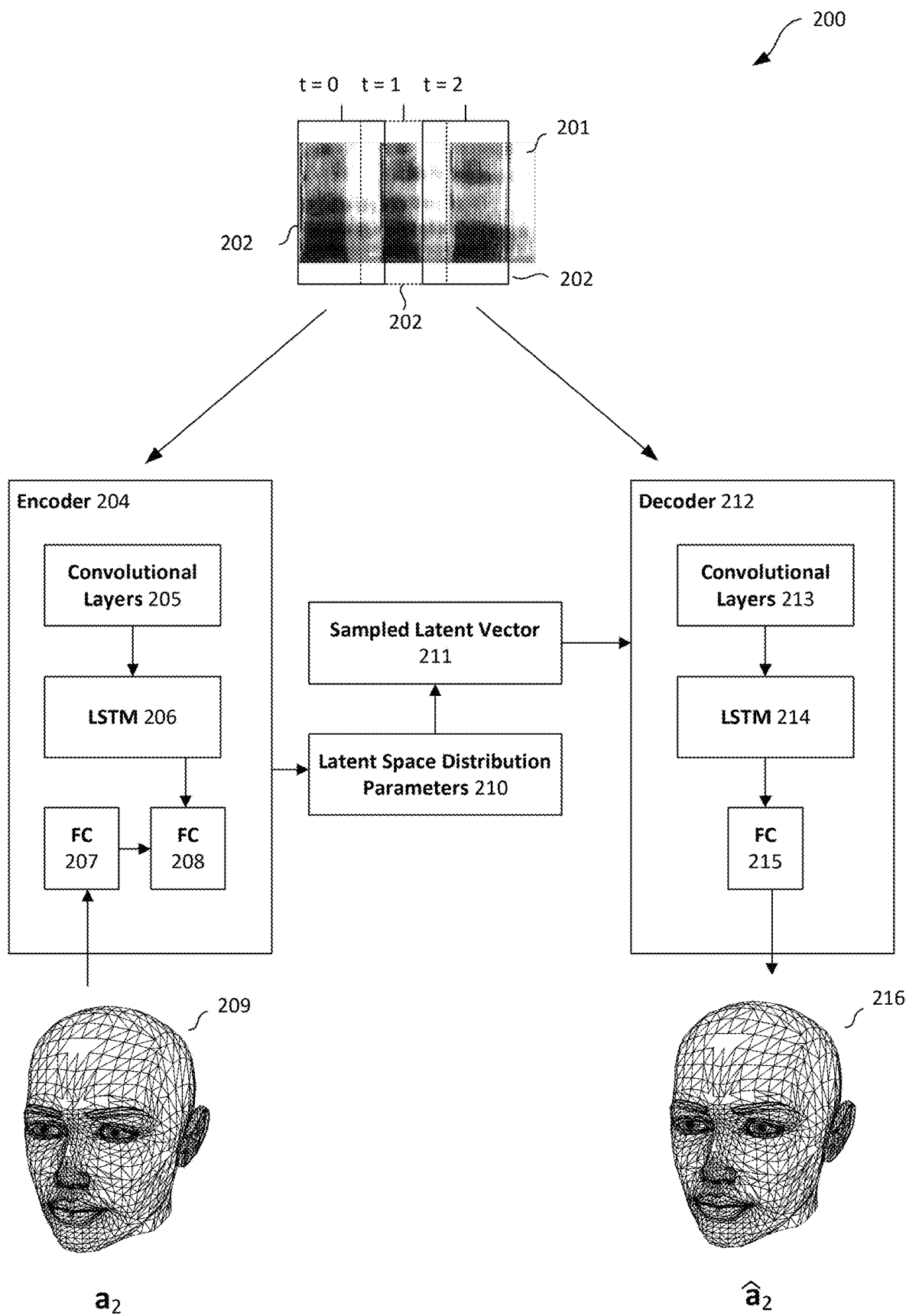
FIG. 2 illustrates an example method for training a conditional variational autoencoder to generate a trained facial animation generative model

FIG. 2 illustrates an example method 200 for training a conditional variational autoencoder (cVAE) to generate a trained facial animation generative model. The conditional variational autoencoder comprises an encoder 204 and a decoder 212. After training of the cVAE is completed, the decoder 212 can be used to provide a trained facial animation generative model. Animation generative models that animate particular elements belonging to a head can be generated in a similar manner. For example, a tongue animation generative model that animates a tongue can be generated by training a cVAE to reconstruct tongue poses given a speech window.

During training, a number of training examples are received. Each training example may comprise speech audio data 201 and an animation frame of ground-truth facial animation data 209. In the example method 200 illustrated in FIG. 2, the speech audio data 201 comprises acoustic features for each of a plurality of audio frames 202, and the ground-truth facial animation data 209 for an animation frame comprises mesh data for a facial mesh. The acoustic features for an audio frame 202 for a time step t may be provided as a matrix $S_t$ representing a speech window centered at the audio frame. For example, $S_t$ may be a matrix of size F×B representing B bins of F acoustic features centered at frame t. The speech windows of adjacent audio frames may overlap with each other, as illustrated in FIG. 2. The mesh data $a_t$ for an animation frame may be provided as a vector of mesh vertex coordinates. For example $a_t$ may be a vector of size 3V representing three-dimensional coordinates for V vertices.

The one or more convolutional layers 205 of the encoder 204 receive acoustic features for a sequence of audio frames 202. In the example illustrated in FIG. 2, the cVAE is being trained to reconstruct facial animation data $a_2$ for an animation frame using a sequence of acoustic features from three audio frames. In general, acoustic frames from a sequence of three audio frames may be processed to reconstruct facial animation data at for a $t^{th}$ animation frame. However, it will be appreciated that acoustic features from a fewer number or a greater number of audio frames 202 may be used to reconstruct facial animation data 209 for animation frames.

The output of the one or more convolutional layers 205 is received by LSTM layers 206. LSTM layers 206 can be used to aggregate temporal information from the sequence of processed speech and may enable temporally stable facial animations to be generated.

The ground-truth facial animation data 209 for an animation frame is received by fully connected layers 207 of the encoder 204. The fully connected layers 207 process the facial animation data 209 to generate a representation of a face pose. The representation of the face pose output by fully connected layers 207 is combined with the output of LSTM layers 206 (e.g. by concatenation) and the combined outputs are processed by fully connected layers 208. In this way, the output of fully connected layer 208 can be used to provide a low-dimensional representation of the face pose that is decoupled from the speech of the sequence of acoustic features.

The output of fully connected layers 208 comprises latent space distribution parameters 210. cVAEs assume the existence of a latent variable that encodes speech-agnostic variation in facial poses, thus learning a latent distribution that represent the space of plausible face poses given speech. The latent space distribution parameters represent parameters for the distribution of the latent space. For example, the latent space distribution parameters 210 may comprise statistics (e.g. means, variances, covariances, standard deviations, etc.) for a multivariate isotropic Gaussian distribution that can model the latent space.

A latent vector 211 is sampled using the latent space distribution parameters 210. This may comprise generating a vector with elements sampled from a standard multivariate normal distribution (i.e. a Gaussian distribution with zero mean and unit variance), and transforming the vector using the latent space distribution parameters 210 to generate the sampled latent vector 211. The sampled latent vector 211 represents a particular plausible face pose given the sequence of acoustic features.

The sampled latent vector 211 is received at one or more convolutional layers 213 of the decoder 212. The one or more convolutional layers 213 also receive acoustic features for the sequence of audio frames 202.

The output of the one or more convolutional layers 213 is received by LSTM layers 214. LSTM layers 214 can be used to aggregate temporal information from the sequence of processed speech and may enable temporally stable facial animations to be generated.

The output of LSTM layers 214 is received by fully connected layers 215. The fully connected layers 215 operate on its received input to generate reconstructed mesh data 216 for the facial mesh. The reconstructed mesh data 216 is for the same animation frame as the animation frame of the mesh data 209 received as input to the encoder 204. The reconstructed mesh data 216 may be a vector having the same shape as the vector representing the input mesh data 209.

A loss is calculated based on the input mesh data 209 for the training example and the reconstructed mesh data 216. For example, the loss may comprise one or more reconstruction losses (e.g. a log-likelihood loss) which aims to minimize differences between the reconstructed mesh data 216 and the input mesh data 209. The loss may comprise one or more divergences (e.g. a Kullback-Liebler divergence) which aims to constrain the latent space distribution determined by the encoder to a selected prior distribution (e.g. a standard multivariate Gaussian distribution). The parameters of the encoder 204 and decoder 212 are updated based on the loss using a suitable optimization procedure. For example, gradient-based methods such as gradient descent may be used to minimize the loss, and backpropagation may be used to determine parameter updates for the various neural network layers. cVAEs and their training are described in greater detail in U.S. patent application Ser. No. 16/394,515 (issued as U.S. Pat. No. 11,049,308), the entirety of which is incorporated herein by reference.

After training of the cVAE, conditioning inputs in the form of latent vectors corresponding to particular speech styles/emotions can be determined. For example, different latent vectors can be provided to the trained decoder 212 to determine the effect of the latent vector on the resulting facial animation. As an example, if inputting a particular latent vector with any speech audio clip to trained decoder 212 generally causes the resulting facial animations to portray a happy expression, the particular latent vector may be stored and associated with an indication of "happy" as a speech emotion. The particular latent vector that has been stored can subsequently be provided as a conditioning input to the trained decoder 212 for generating facial animations with a happy expression.

In this way, conditioning inputs comprising latent vectors corresponding to various speech styles/emotions (e.g. happy, angry, sad, neutral) can be identified. A database in the form of a latent codebook, which identifies particular latent vectors with associated speech styles/emotions may thus be developed.

Figure 6:
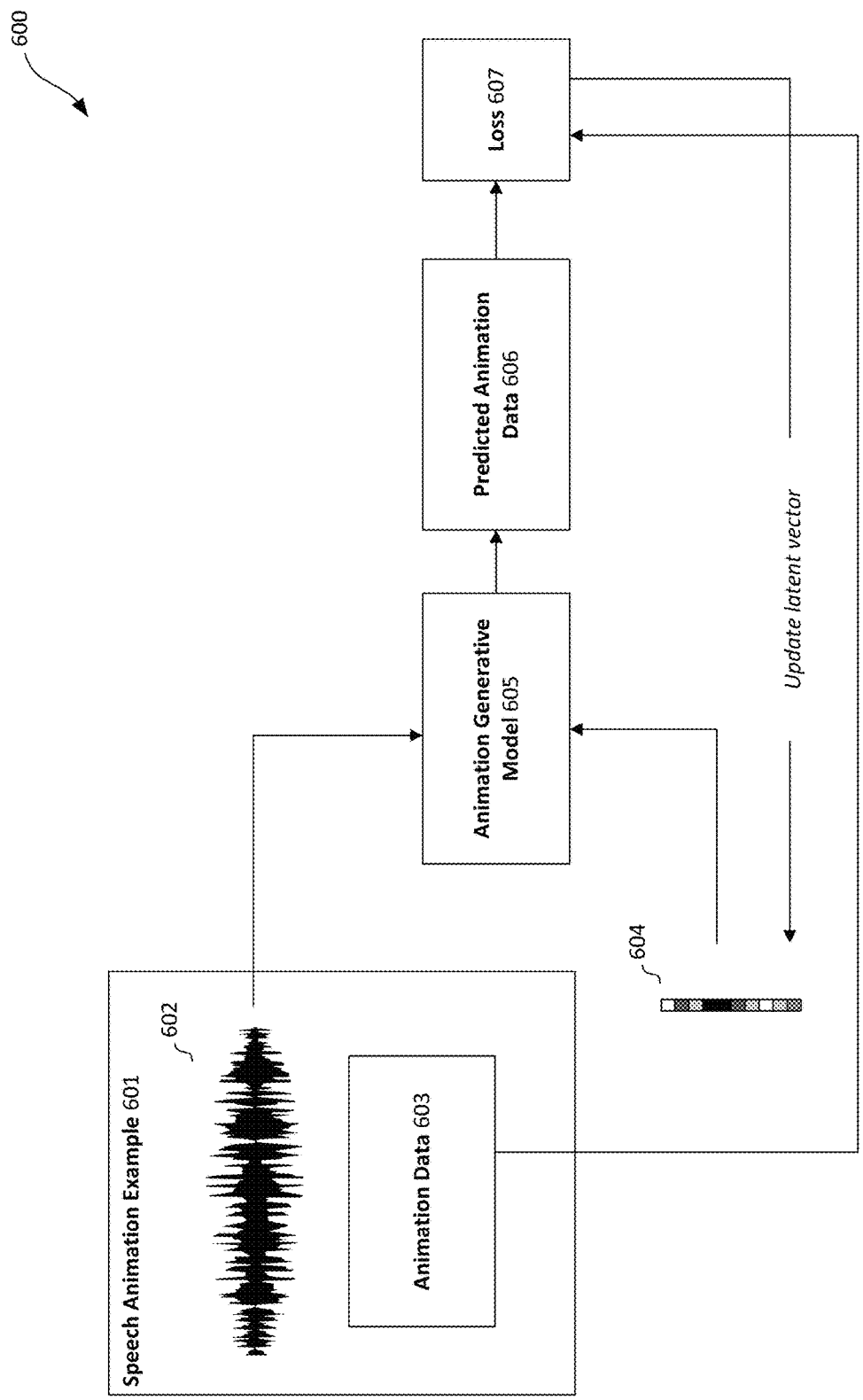
FIG. 6 illustrates an example method for generating a conditioning input for a particular facial expression.

As another example, latent vectors corresponding to various speech styles/emotions can be identified using latent optimization and reference speech animation examples, as is described in greater detail in relation to FIG. 6.

As described previously, animation generative models that animate a particular element belonging to a head can be generated in a similar manner to the above-described method. In these examples, the input mesh data 209 and the reconstructed mesh data 216 would correspond to mesh data for the particular element of a face. For example, in order to generate a tongue animation generative model, the input mesh data 209 and the reconstructed mesh data 216 may comprise tongue mesh data.

Example Facial Animation Data Generation Method

Figure 3:
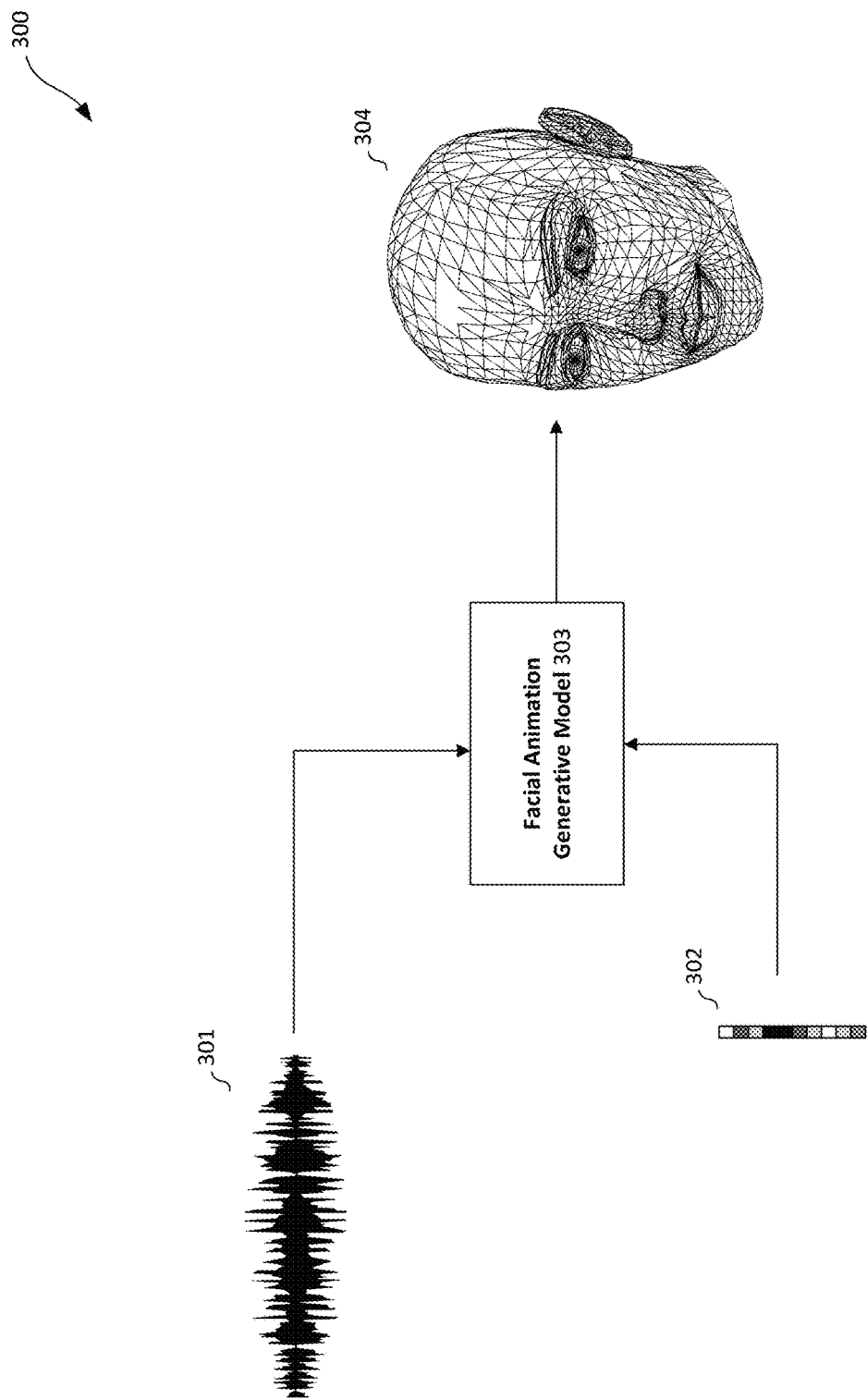
FIG. 3 illustrates an example method for generating facial animation data using a facial animation generative model.

FIG. 3 illustrates an example method 300 for generating facial animation data 304 using a facial animation generative model 303. For illustrative purposes, the facial animation data 304 is illustrated as a facial mesh representing a facial pose however it will be appreciated that facial animation data 304 may be provided in other forms, such as rig parameters representing the facial pose.

The facial animation generative model 303 comprises a conditional generative model that has been trained to learn a mapping from an embedding/latent space to a space of face poses, conditioned on speech audio. The facial animation generative model 303 may comprise a decoder of a trained conditional variational autoencoder, as described in relation to FIG. 2 for example. Additionally or alternatively, the facial animation generative model 303 may comprise one or more of: a generator neural network of a conditional generative adversarial neural network; a conditional flow-based model, which is optionally a conditional normalizing flow model; and a conditional denoising diffusion model.

The method 300 involves processing speech audio data 301 representing speech audio. Speech audio data 301 may comprise any suitable representation of speech audio, e.g. a waveform of speech audio, acoustic features of speech audio etc. The speech audio data 301 may comprise data (e.g. amplitudes, acoustic features, etc.) for each time step of a plurality of time steps. The data associated with a time step may be referred to as a speech audio frame.

The facial animation generative model 303 receives a conditioning input 302 and input data derived from the speech audio data 301. The input data may be the speech audio data 301, or the speech audio data 301 may be processed before input to the facial animation generative model 303. For example, if the speech audio data 301 comprises a waveform of speech audio data, acoustic features of the speech audio data 301 may be determined and subsequently provided as input to the facial animation generative model 303. As another example, the speech audio data 301 may be processed by a speech processing neural network (e.g. a speech transcription neural network). Outputs generated by one or more neural network layers of the speech processing neural network may be provided as input to the facial animation generative model 303. The input data may comprise data for each time step of a plurality of time steps.

The conditioning input 302 may be pre-determined, i.e. determined prior to performing the method 300. The determination of conditioning inputs in the form of latent vectors will be described in greater detail in relation to FIGS. 5 and 6.

The conditioning input 302 may be provided in any appropriate manner. For example, the conditioning input 302 may be a latent vector. The latent vector can be determined in any appropriate manner, e.g. by latent optimization using reference speech animations associated with a particular speech style/emotion, by investigating the effects in resulting facial animations using randomly generated latent vectors, etc.

A single conditioning input 302 may be provided for the entire speech audio, and/or a plurality of conditioning inputs 302 may be provided. For example, a particular conditioning input 302 may be provided for a first portion of the speech audio, and a second conditioning input 302 may be provided for a second portion of the speech audio. In this way, control of the facial expression of the resulting facial animation over the duration of the speech audio can be provided.

The facial animation generative model 303 processes the conditioning input 302 and input derived from speech audio data 301 and generates facial animation data 304. The facial animation data 304 may be facial animation data for a particular animation frame. For example, the facial animation generative model 303 may process a conditioning input and a speech audio frame of the speech audio data 301 and generate facial animation data 304 for a corresponding animation frame. In this way, a facial animation can be generated, e.g. by generating facial animation data 304 for each of a plurality of animation frames.

In some embodiments, the facial animation data 304 may comprise mesh data for a facial mesh. Mesh data defines a configuration (e.g. the 3D shape) of at least part of a facial mesh. Mesh data may for example specify the position of elements of the facial mesh such as vertices and/or edges. In some examples, mesh data may define the configuration (e.g. shape) of a mesh by specifying a deformation or transformation from a default/neutral facial mesh configuration. Mesh data may be represented as a vector defining co-ordinates for each vertex of a plurality of vertices.

In some embodiments, the facial animation data 304 may comprise rig parameters for a facial animation rig. A facial animation rig may be used to provide controls (rig parameters) for animators to modify face poses. The facial animation rig defines a model that transforms rig parameters into mesh data for the facial pose. The facial animation rig may be skeletal-based, wherein the controls define the configuration (e.g. rotation) of various joints of a skeleton, and the mesh is generated/deformed based on the configuration of the joints. Additionally or alternatively, the facial animation rig may be based on blend shapes (or any other suitable set of basis shapes) that define modifications of the mesh (e.g. from a default/neutral configuration of the mesh), wherein the controls define how different blend shapes are combined. A weight may be determined for each of the blend shapes from the controls, and the mesh may be generated using the blend shapes and their respective weights. Rig parameters may be represented as a vector defining the rig parameters.

The facial animation generative model 303 may be trained in a similar method to the training described in relation to FIG. 2 of the decoder of the cVAE. In this way, facial animation generative model 303 can be used to generate facial animations in accordance with the speech sounds and speech emotion of speech audio. The facial animation data 304 is used to animate various facial elements, e.g. eyes, eyebrows, nose, cheeks, jaws, mouth, etc. The facial animation generative model 303 may be used to generate facial animation data 304 for a particular facial element instead of a whole face.

Further animation generative models can be used to animate various bodily elements, which may be related to the face, using a similar method. This may include tongues, necks, throats, shoulders, chests, etc. These further animation generative models, if provided, comprise conditional generative models that have been trained to generate animation data that animates the various bodily elements.

Example Tongue Animation Data Generation Method

Figure 4:
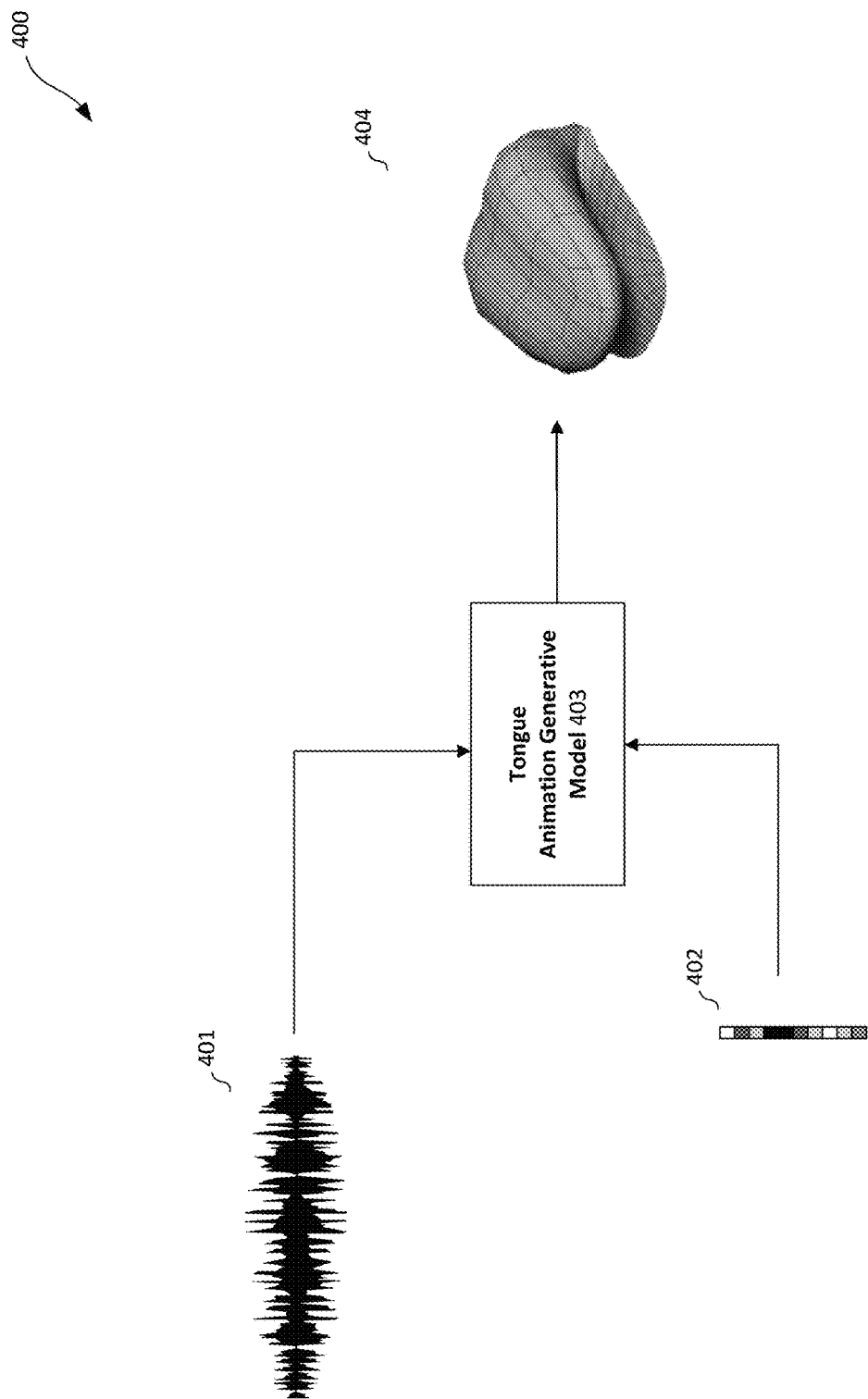
FIG. 4 illustrates an example method for generating tongue animation data using a tongue animation generative model.

FIG. 4 illustrates an example method 400 for generating tongue animation data 404 using a tongue animation generative model 403, similar to the example method of generating facial animation data described in relation to FIG. 3.

The tongue animation generative model 403 comprises a conditional generative model that has been trained to learn a mapping from an embedding/latent space to a space of tongue poses, conditioned on speech audio. The tongue animation generative model 403 may comprise a decoder of a trained conditional variational autoencoder, as described in relation to FIG. 2 for example. Additionally or alternatively, the tongue animation generative model 403 may comprise one or more of: a generator neural network of a conditional generative adversarial neural network; a conditional flow-based model, which is optionally a conditional normalizing flow model; and a conditional denoising diffusion model.

As described in relation to the facial animation generative model of FIG. 3, the tongue animation generative model 403 receives a conditioning input 402 and input data derived from the speech audio data 401. In some implementations, a default conditioning input 402 may be provided for every example of speech audio. For example, a zero vector may be provided to the tongue animation generative model 403 when generating tongue animations. Additionally or alternatively, conditioning inputs may be provided from a set of pre-determined conditioning inputs. The set of pre-determined conditioning inputs may be determined in any appropriate manner, e.g. by investigating the effects in resulting tongue animations using manually selected or randomly generated latent vectors, by performing latent optimization using reference speech animations associated with a particular speech style/emotion, etc.

The tongue animation generative model 403 processes the conditioning input 402 and input derived from speech audio data 401 and generates tongue animation data 404. The tongue animation data 404 may be tongue animation data for a particular animation frame. For example, the tongue animation generative model 403 may process a conditioning input and a speech audio frame of the speech audio data 401 and generate tongue animation data 404 for a corresponding animation frame. In this way, a tongue animation can be generated, e.g. by generating tongue animation data 404 for each of a plurality of animation frames.

In some embodiments, the tongue animation data 404 may comprise mesh data for a tongue mesh. Additionally or alternatively, the tongue animation data 404 may comprise rig parameters for a tongue animation rig.

The tongue animation generative model 403 may be trained in a similar method to the training described in relation to FIG. 2 of the decoder of the cVAE.

Animation data may be generated from a combination of facial animation data and tongue animation data 403. For example, the tongue animation data 404 may be combined with facial animation data generated by a facial animation generative model. This may be achieved by a post-processing step that places the tongue animation specified by the tongue animation data 403 in the same space as the facial animation specified by the facial animation data. For example, a tongue origin point may be specified in a three-dimensional facial mesh space used to specify facial meshes of facial animations. Tongue animations may be placed in the three-dimensional facial mesh space based on the tongue origin point. For example, an origin point for the tongue meshes of tongue animations may be mapped to the tongue origin point, and the same mapping can be applied to all co-ordinates specified by the tongue mesh.

Example Conditioning Inputs

FIG. 5 illustrates example conditioning inputs for use in conditioning an animation generative model. In particular, FIG. 5 schematically illustrates an example latent codebook 500 comprising latent vectors 501 for use in conditioning a facial animation generative model. The set of latent vectors 501 may comprise latent vector 502-1 corresponding to a sad speech emotion, latent vector 502-2 corresponding to a neural speech emotion, and latent vector 502-3 corresponding to a happy speech emotion. FIG. 5 also displays the respective effects in the resulting facial animation when applying each latent vector 502 as a conditioning input to the facial animation generative model. The set of latent vectors can be determined in any appropriate manner, e.g. by latent optimization using reference speech animations associated with a particular speech style/emotion, by investigating the effects in resulting facial animations using randomly generated latent vectors, etc.

Similarly, latent codebooks can be provided for other animation generative models, such as the tongue animation generative model described in relation to FIG. 4.

Example Conditioning Input Determination Method

FIG. 6 illustrates an example method 600 for generating a conditioning input for a particular facial expression. In particular, FIG. 6 illustrates updating an initial latent vector 604 to generate a conditioning input in the form of an updated latent vector. The method 600 can be performed to generate conditioning inputs for any appropriate animation generative model 605, such as the facial animation generative model described in relation to FIG. 3 and/or the tongue animation generative model described in relation to FIG. 4.

For illustrative purposes, FIG. 6 illustrates the method 600 receiving a single speech animation example 601, however it will be appreciated that multiple examples 601 may be processed at the same time for updating the initial latent vector 604 (e.g. using batch processing of a batch of examples 601). For example, speech animation examples 601 with speech audio from different speakers may be provided.

Each speech animation example 601 comprises speech audio data 602 and corresponding animation data 603. Each speech animation example 601 used to generate a conditioning input for a particular facial expression is associated with the particular facial expression. For example, the animation data 603 of each speech animation example 601 may represent a facial animation portraying a happy expression. These speech animation examples 601 can be used to generate a conditioning input representing a happy facial expression.

The speech audio data 602 may comprise any appropriate representation of speech audio. For example, the speech audio data 602 may comprise a waveform of speech audio, compressed representations of speech audio (e.g. acoustic features for speech audio), etc. The animation data 603 comprises data representing an animation that is associated with the speech audio data 602. The animation data 603 may be facial animation data and/or animation data for other elements (e.g. tongue animation data). The animation data 603 may comprise mesh data (e.g. for a facial mesh or a tongue mesh) and/or rig parameters (e.g. for a facial animation rig or a tongue animation rig). The speech audio data 602 may comprise a plurality of audio frames, and the animation data 603 may comprise a plurality of animation frames. Each audio frame may be associated with one or more animation frames.

The animation generative model 605 receives an initial latent vector 604 and input data derived from the speech audio data 602. The input data may be the speech audio data 602, or the speech audio data 602 may be processed before input to the animation generative model 605. For example, if the speech audio data 602 comprises a waveform of speech audio data, acoustic features of the speech audio data 602 may be determined and subsequently provided as input to the animation generative model 605. As another example, the speech audio data 602 may be processed by a speech processing neural network (e.g. a speech transcription neural network). Outputs generated by one or more neural network layers of the speech processing neural network may be provided as input to the animation generative model 605. The input data may comprise data for each time step of a plurality of time steps.

The initial latent vector 604 may be provided in any suitable manner. For example, a default vector such as a zero vector may be provided as the initial latent vector 604. As another example, the initial latent vector 604 may be randomly sampled from an appropriate distribution, e.g. a Gaussian distribution. The initial latent vector 604 may be sampled from a latent space distribution that was learned during training of the animation generative model 605.

The animation generative model 605 comprises a conditional generative model 605 that has been trained to generate predicted animation data 606 conditioned on speech audio data 602 and latent vectors 604. The predicted animation data 606 comprises animation data representing similar information to the animation data 603 of the speech animation example 601. For example, for animation data 603 comprising mesh data for a facial mesh, the predicted animation data 606 comprises a representation of predicted mesh data for the facial mesh.

A loss 607 is calculated in dependence on the animation data 603 and the predicted animation data 606. The loss 607 compares the animation data 603 and the predicted animation data 606 and provides a signal for updating the initial latent vector 604. The goal is to update the initial latent vector 604 such that, when applied as input to animation generative model 605, the animation generative model 605 generates predicted animation data 606 that closely matches the animation data 603. In this way, the initial latent vector 604 may be updated to generate an updated latent vector that represents the particular facial expression of the speech animation example(s) 601.

This may be achieved by updating the initial latent vector 604 to minimize differences between the predicted animation data 606 and animation data 603. The loss 607 may comprise any suitable losses/errors e.g. cross-entropy losses, logistic losses, log-likelihoods, mean squared errors, mean absolute errors, etc. The loss 607 may further comprise regularization terms e.g. $L_1$ regularization terms, $L_2$ regularization terms, etc.

An optimization procedure is used to minimize the loss 607. For example, the optimization procedure may use gradient-based methods such as stochastic gradient descent, mini-batch gradient descent, or batch gradient descent, including momentum-based methods such as Adam, RMSProp, and AdaGrad. Backpropagation of the loss 607 may be performed to determine updates for the initial latent vector 607. Parameters of the animation generative model 605 may be frozen so that they are not updated during backpropagation.

The updating of the initial latent vector 604 may be terminated based on any suitable termination criteria. For example, the updating may be terminated after all of the speech animation examples 601 associated with the particular facial expression have been processed for a number of iterations and/or based on convergence of an error based on the losses 607 of speech animation examples 601. After termination, the updated latent vector is stored in association with an indication for the particular facial expression. The method 600 can be performed to determine a latent vector for any number of facial expressions. In this way, a latent codebook as described in relation to FIG. 5 can be provided.

Example Rig Parameter Generation Method

Figure 7:
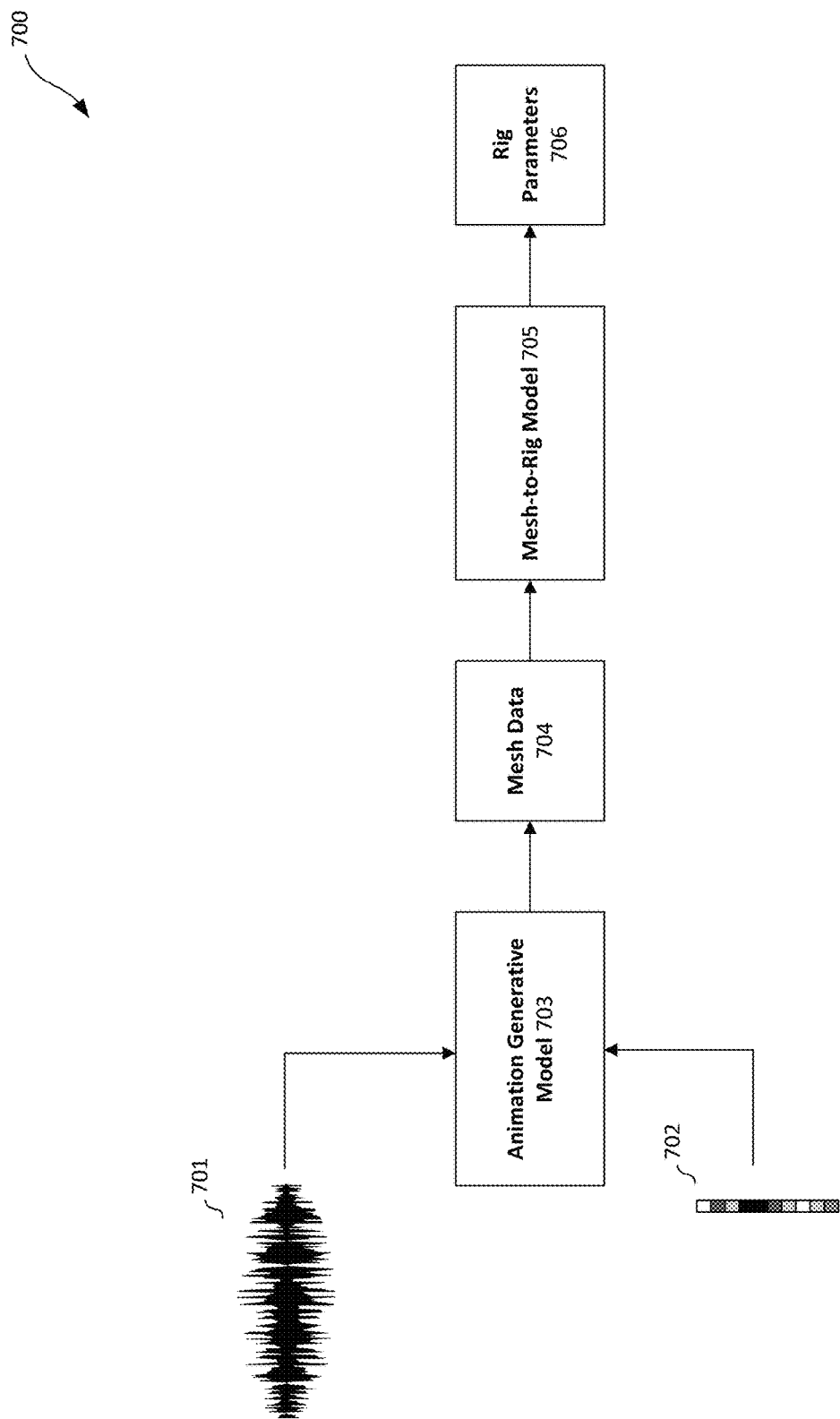
FIG. 7 illustrates an example method for generating animation data comprising rig parameters.

FIG. 7 illustrates an example method 700 for generating animation data comprising rig parameters 706. In particular, FIG. 7 illustrates using an animation generative model 703 to generate mesh data 704. The mesh data 704 is generated in a similar manner to the example methods described in relation to FIGS. 3 and 4. The mesh data 704 is applied as input to a mesh-to-rig model 705 to generate the rig parameters 706. The mesh data 704 may be mesh data for a facial mesh, or mesh data for a tongue mesh for example.

The animation generative model 703 receives data derived from speech audio data 701 and a conditioning input 702. The animation generative model 703 may be, for example, the facial animation generative model 703 described in relation to FIG. 3. Alternatively, the animation generative model 703 may be the tongue animation generative model described in relation to FIG. 4. The animation generative model 703 processes its received inputs and generates mesh data 704.

Mesh data 704 is received by mesh-to-rig model 705. The mesh-to-rig model 705 comprises a model that has been learned (e.g. trained) to generate rig parameters 706 from mesh data 704. For mesh data 704 comprising mesh data for a facial mesh, the mesh-to-rig model 705 may be a facial mesh-to-rig model. A facial mesh-to-rig model comprises a model that has been trained to generate, from the mesh data 704 for a facial mesh, rig parameters 706 for a facial animation rig. For mesh data 704 comprising mesh data for a tongue mesh, the mesh-to-rig model 705 may be a tongue mesh-to-rig model. A tongue mesh-to-rig model comprises a model that has been trained to generate, from the mesh data 704 for a tongue mesh, rig parameters 706 for a tongue animation rig.

The mesh-to-rig model 705 comprises a machine-learned model. For example, the mesh-to-rig model 705 may comprise a neural network comprising a plurality of neural network layers. The neural network layers may comprise feedforward layers, e.g. fully connected layers and/or convolutional layers. Additionally or alternatively, the neural network layers may comprise recurrent layers, e.g. LSTM layers and/or bidirectional LSTM layers. Additionally or alternatively, the mesh-to-rig model 705 may comprise one or more Transformer encoder and/or decoder blocks. Additionally or alternatively, the mesh-to-rig model 705 may comprise a linear function with learned coefficients, a polynomial function with learned coefficients, etc.

The generated rig parameters 706 are used to form an animation sequence. For example, mesh data 704 and corresponding rig parameters 706 may be determined for each of a plurality of animation frames. Each animation frame may be associated with a corresponding audio frame of the speech audio data 701. The rig parameters 706 are stored, and an animation sequence may be provided by applying the stored rig parameters 706 to a corresponding animation rig (e.g. a facial animation rig). The stored rig parameters 706 may be modified by a user to provide control of the resulting animation sequences.

Example Mesh-to-Rig Model Training Method

Figure 8:
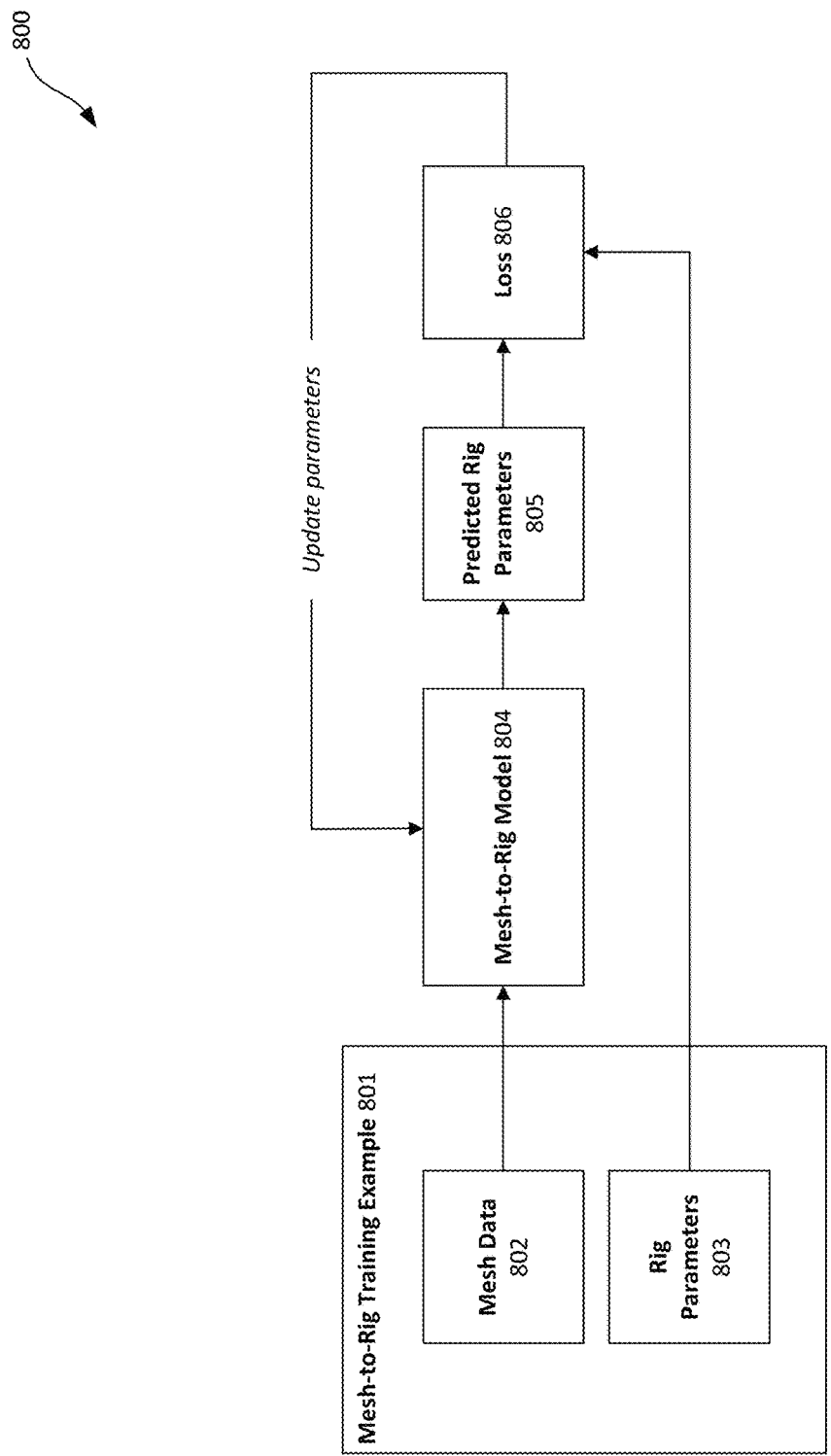
FIG. 8 illustrates an example method for training a mesh-to-rig model.

FIG. 8 illustrates an example method 800 for training a mesh-to-rig model 804. For illustrative purposes, the Figure illustrates training using a single mesh-to-rig training example 801, however it will be appreciated that multiple training examples 801 may be processed at the same time for training the mesh-to-rig model 804 (e.g. using batch processing of a batch of training examples 801).

During training, mesh-to-rig training examples 801 are received. Each mesh-to-rig training example 801 comprises mesh data 802 and corresponding rig parameters 803 (also referred to herein as "ground-truth" rig parameters). For training of a facial mesh-to-rig model, the mesh data 802 may comprise mesh data for a facial mesh with corresponding rig parameters 803 for a facial animation rig. For training of a tongue mesh-to-rig model, the mesh data 802 may comprise mesh data for a tongue mesh with corresponding rig parameters 803 for a tongue animation rig.

The mesh data 802 and corresponding rig parameters 803 for a mesh-to-rig training example 801 may be obtained in any suitable manner. For example, mesh data 802 and corresponding rig parameters 803 can be obtained from existing speech animation examples. As another example, a set of randomized rig parameters 803 may be obtained, and mesh data 802 may be generated by an animation rig using the randomized rig parameters.

The mesh-to-rig model 804 receives the mesh data 802 of the mesh-to-rig training examples 801. The mesh-to-rig model 804 comprises a machine-learning model that is being trained to generate predicted rig parameters 805 that are similar to (e.g. that closely match) the rig parameters 803 of the mesh-to-rig training examples 801. For example, the mesh-to-rig model 804 may comprise a neural network comprising a plurality of neural network layers. The neural network layers may comprise feedforward layers, e.g. fully connected layers and/or convolutional layers. Additionally or alternatively, the neural network layers may comprise recurrent layers, e.g. LSTM layers and/or bidirectional LSTM layers. Additionally or alternatively, the mesh-to-rig model 804 may comprise one or more Transformer encoder and/or decoder blocks. Additionally or alternatively, the mesh-to-rig model 804 may comprise a linear function with parameters/coefficients, a polynomial function with parameters/coefficients, etc.

The mesh-to-rig model 804 processes the mesh data 802 and generates predicted rig parameters 805. In some implementations, the mesh data 802 may be pre-processed by the mesh-to-rig model 804. For example, noise may be added to the mesh data 802 before generating the predicted rig parameters 805 (e.g. by adding the noise in an input layer). This may improve the performance of the trained mesh-to-rig model when processing mesh data generated by an animation generative model (e.g. by generating more suitable rig parameters for such mesh data).

A loss 806 is calculated in dependence on the ground-truth rig parameters 803 and the predicted rig parameters 805. The loss 806 compares the ground-truth rig parameters 803 and the predicted rig parameters 805 and provides a training signal for training the mesh-to-rig model 804. The goal for training is to update parameters of the mesh-to-rig model 804 to generate appropriate rig parameters 805 by minimizing differences between the predicted rig parameters 805 and ground-truth rig parameters 803. The loss 806 may comprise any suitable losses/errors e.g. cross-entropy losses, logistic losses, log-likelihoods, mean squared errors, mean absolute errors, etc. The loss 806 may further comprise regularization terms e.g. $L_1$ regularization terms, $L_2$ regularization terms, etc.

An optimization procedure is used to minimize the loss 806. For example, the optimization procedure may use gradient-based methods such as stochastic gradient descent, mini-batch gradient descent, or batch gradient descent, including momentum-based methods such as Adam, RMSProp, and AdaGrad. Backpropagation of the loss 806 may be performed to determine parameter updates for the mesh-to-rig model 804. In some implementations, parameter updates may be determined in exact form without using backpropagation, for example for mesh-to-rig model 804 comprising only linear/polynomial functions.

Training of the mesh-to-rig model 804 may be terminated based on any suitable termination criteria. For example, training may be terminated after completion of a certain number of training iterations that each determine parameter updates and apply the updated parameters to the mesh-to-rig model 804. Additionally or alternatively, training may be terminated based on performance of the mesh-to-rig model 804 on a validation training set of validation training examples. Performance of the mesh-to-rig model 804 may be measured using any appropriate metric, e.g. validation accuracy, validation loss etc. Training may be terminated based on a determination that the performance of the mesh-to-rig model 804 exceeds a certain threshold.

After training is terminated, the trained mesh-to-rig model 804 can be used to generate predicted rig parameters 805 for new examples of mesh data 802, including mesh data 802 generated by animation generative models.

Example Speech Audio Pre-Processing Method

Figure 9:
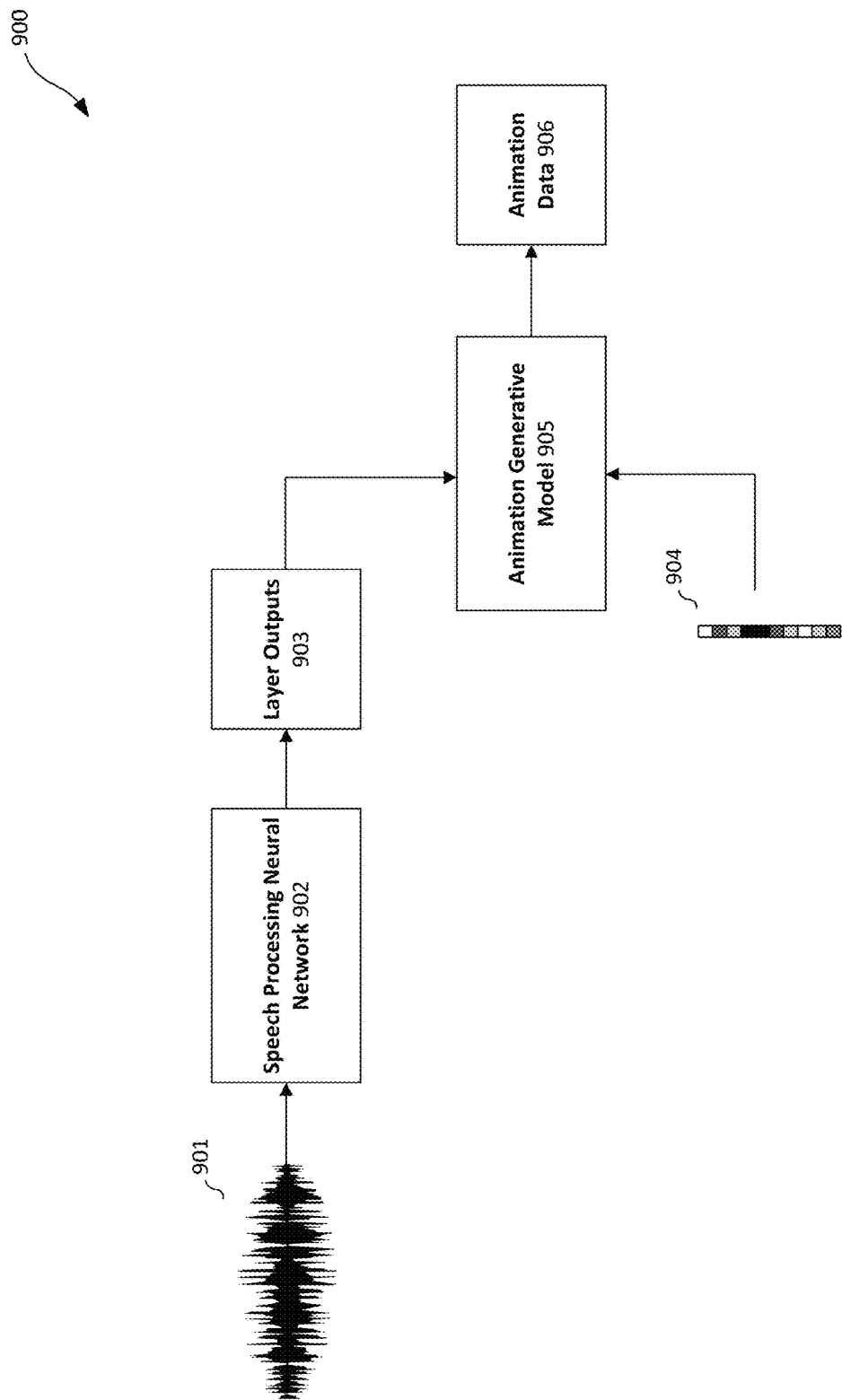
FIG. 9 illustrates an example method for generating animation data using input data generated from a speech processing neural network.

FIG. 9 illustrates an example method 900 for generating animation data 906 using input data generated from a speech processing neural network 902. The method 900 can be performed using any appropriate animation generative model 905, such as the facial animation generative model described in relation to FIG. 3 and/or the tongue animation generative model described in relation to FIG. 4.

Similar to the example methods described in relation to FIGS. 3 and 4, the method 900 receives speech audio data 901 and a conditioning input 904. The speech audio data 901 is pre-processed prior to input to the animation generative model 905. In particular, speech processing neural network 902 processes the speech audio data 901 and generates layer outputs 903 to form input data for the animation generative model 905.

The speech processing neural network 902 comprises a neural network that has been trained to perform a speech processing task. For example, the speech processing neural network 902 may be a pre-trained speech recognition model, such as a speech transcription neural network, that has been trained to generate a representation of speech content for input speech audio. As another example, the speech processing neural network 902 may be a pre-trained speaker verification neural network that has been trained to predict whether input speech audio belongs to a particular speaker.

The speech processing neural network 902 may be trained using speech audio belonging to a number of different speakers. This can allow the speech processing neural network 902 to generate more general representations of speech audio, e.g. by reducing speaker-dependent information of the speech audio.

The speech processing neural network 902 comprises a plurality of neural network layers. The neural network layers may comprise feedforward layers, e.g. fully connected layers and/or convolutional layers. Additionally or alternatively, the neural network layers may comprise recurrent layers, e.g. LSTM layers and/or bidirectional LSTM layers. Additionally or alternatively, the speech processing neural network 902 may comprise one or more Transformer encoder and/or decoder blocks.

During processing of speech audio data 901, each neural network layer generates a layer output 903. The layer outputs 903 may represent different characteristics/information of the speech audio, e.g. depending on the neural network layer. For example, in a speech recognition/transcription neural network, initial/earlier neural network layers may generate layer outputs 903 mostly representing speech audio information. Subsequent/later neural network layers may generate layer outputs 903 mostly representing speech content information.

Layer outputs 903 from one or more neural network layers of the speech processing neural network 902 are used to form an input to the animation generative model 905. For example, outputs 903 from an output layer of the speech processing neural network may form the input to the animation generative model 905. Additionally or alternatively, outputs 903 from one or more layers preceding the output layer may be used to form the input to the animation generative model 905. The layer outputs 903 may comprise a representation for each of a plurality of time steps of the speech audio data 901. For example, the layer outputs 903 may be provided as a sequence of vectors, with each vector being associated with a particular time step. In some examples, the input to the animation generative model 905 can include a combination of the layer outputs 903 and acoustic features of the speech audio.

The input formed from the layer outputs 903 and a conditioning input 904 is received by animation generative model 905. The animation generative model 905 processes the received inputs and generates the animation data 906.

Figure 10:
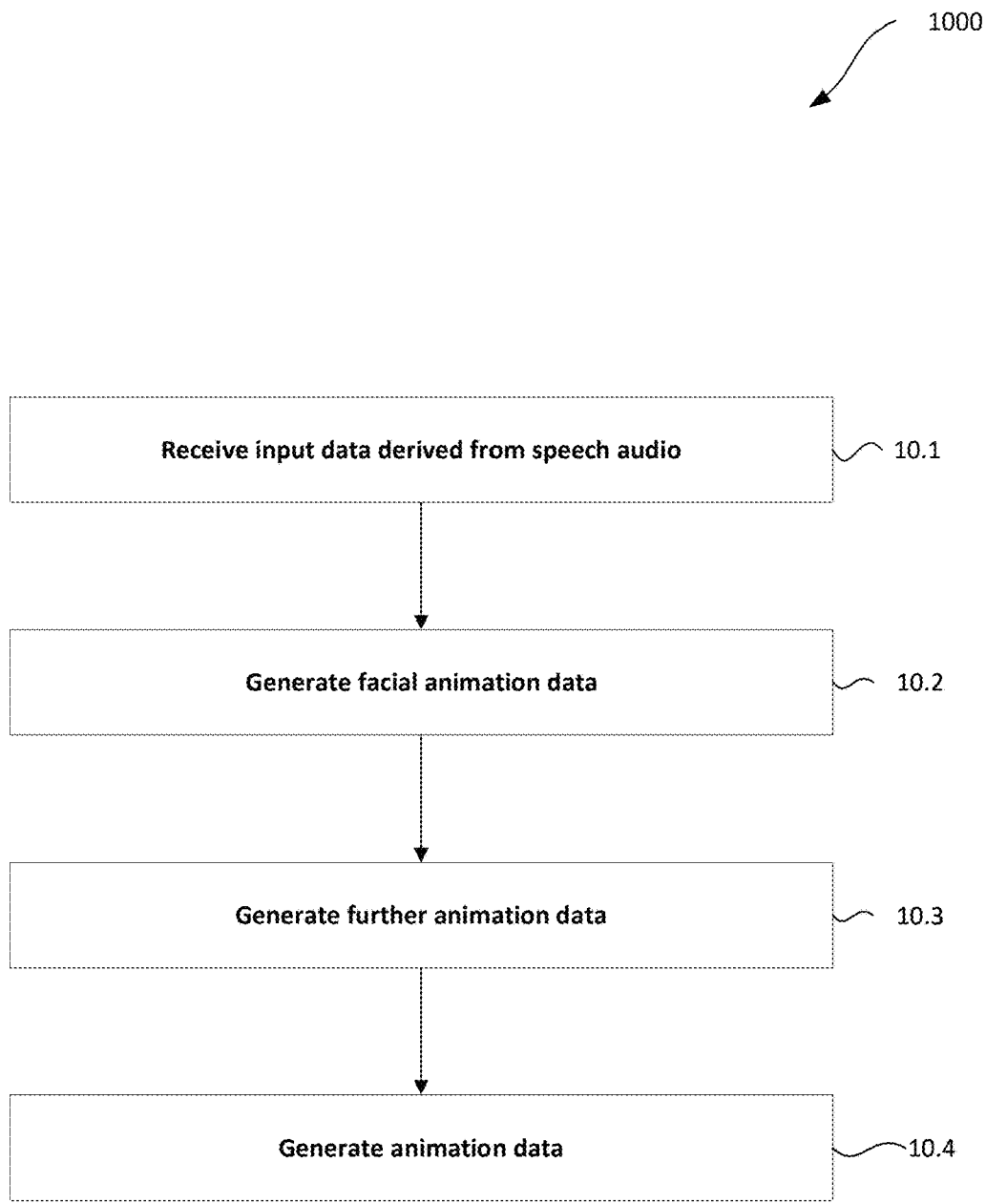
FIG. 10 is a flow diagram illustrating an example method for generating animation data from facial animation data and further animation data.

FIG. 10 is a flow diagram illustrating an example method 1000 for generating animation data from facial animation data and further animation data. The animation data animates at least a face in a video game in accordance with speech sounds of speech audio.

In step 10.1, input data derived from speech audio is received. The input data derived from the speech audio may comprise acoustic features determined from the speech audio. The input data derived from the speech audio may comprise outputs generated by one or more neural network layers of a neural network model that has been trained to perform speech transcription. The outputs may be generated by processing the speech audio using the neural network model.

In step 10.2, the facial animation data is generated. This comprises processing the input data and a conditioning input using a machine-learned generative model. The machine-learned generative model may comprise at least one of: a decoder of a variational autoencoder; a generator neural network of a generative adversarial neural network; a flow-based model, which is optionally a normalizing flow model; and a diffusion model.

In step 10.3, the further animation data is generated. This comprises processing the input data using a further machine-learned generative model. The further animation data may comprise tongue animation data that animates a tongue for the face in the video game. The further machine-learned generative model may comprise at least one of: a decoder of a variational autoencoder; a generator neural network of a generative adversarial neural network; a flow-based model, which is optionally a normalizing flow model; and a diffusion model.

In step 10.4, the animation data is generated. The animation data is generated using the facial animation data and the further animation data.

Figure 11:
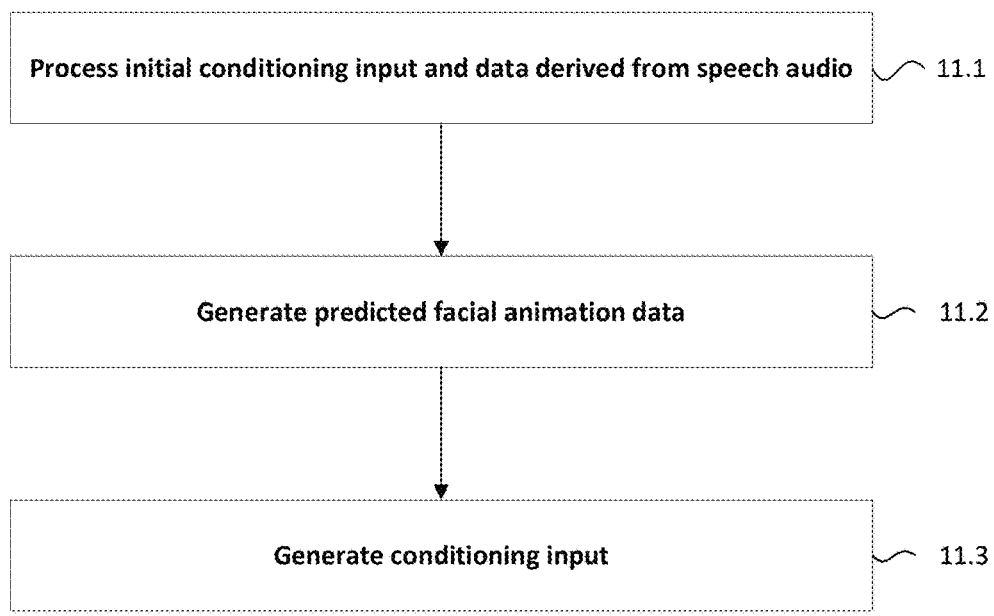
FIG. 11 is a flow diagram illustrating an example method for generating a conditioning input for a particular facial expression.

FIG. 11 is a flow diagram illustrating an example method 1100 for generating a conditioning input for a particular facial expression.

In step 11.1, an initial conditioning input and data derived from speech audio are processed. This comprises processing, using a machine-learned generative model: (i) an initial conditioning input, and (ii) data derived from speech audio of one or more speech animation examples associated with the particular facial expression. Each speech animation example comprises the data derived from the speech audio and corresponding ground-truth facial animation data.

The one or more speech animation examples may comprise a plurality of speech animation examples generated using speech audio associated with a plurality of speakers.

In step 11.2, predicted facial animation data is generated. This comprises generating, as output of the machine-learned generative model, predicted facial animation data for each speech animation example.

In step 11.3, the conditioning input representing the particular facial expression is generated. This comprises determining a loss for each speech animation example. The loss of a speech animation example is dependent on the predicted facial animation data and the ground-truth facial animation data of the training example. The generating further comprises updating the initial conditioning input based on the losses of the speech animation examples.

Generating the conditioning input may comprise freezing weights of the machine-learned generative model; and updating the initial conditioning input using a gradient-based optimization procedure and the losses of the speech animation examples. Determining the loss of a speech animation example may comprise performing a comparison between the predicted facial animation data and the ground-truth facial animation data of the speech animation example.

The method may further comprise generating facial animation data that animates a face in a video game in accordance with speech sounds of speech audio and the selected facial expression. This may comprise receiving the conditioning input associated with the selected facial expression; and generating the facial animation data. The generating may comprise processing the conditioning input and input data derived from the speech audio using the machine-learned generative model.

Figure 12:
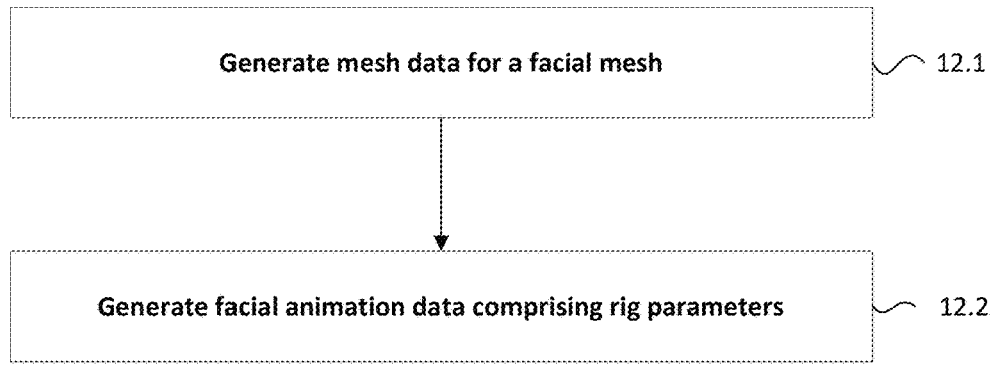
FIG. 12 is a flow diagram illustrating an example method for generating facial animation data comprising rig parameters.

FIG. 12 is a flow diagram illustrating an example method 1200 for generating facial animation data comprising rig parameters. The facial animation data animates a face in a video game in accordance with speech sounds of speech audio. The facial animation data comprises rig parameters for a facial animation rig.

In step 12.1, mesh data for a facial mesh is generated. This comprises processing input data derived from the speech audio and a conditioning input using a machine-learned generative model.

In step 12.2, the facial animation data comprising the rig parameters is generated. This comprises processing the mesh data using a machine-learned mesh-to-rig model. The machine-learned mesh-to-rig model may comprise a neural network.

The method may further comprise generating tongue animation data. The tongue animation data may comprise rig parameters for a tongue animation rig. The tongue animation data may be generated by generating mesh data for a tongue mesh, comprising processing the input data derived from the speech audio using a further machine-learned generative model; and generating the tongue animation data comprising the rig parameters, comprising processing the mesh data for the tongue mesh using a further machine-learned mesh-to-rig model. The further machine-learned mesh-to-rig-model may comprise a polynomial function. The method may further comprise generating, using the facial animation data and the tongue animation data, animation data that animates at least the face in the video game.

The machine-learned generative model and/or the further machine-learned generative model may comprise at least one of: a decoder of a conditional variational autoencoder; a generator neural network of a conditional generative adversarial neural network; a conditional flow-based model, which is optionally a conditional normalizing flow model; and a conditional denoising diffusion model.

Figure 13:
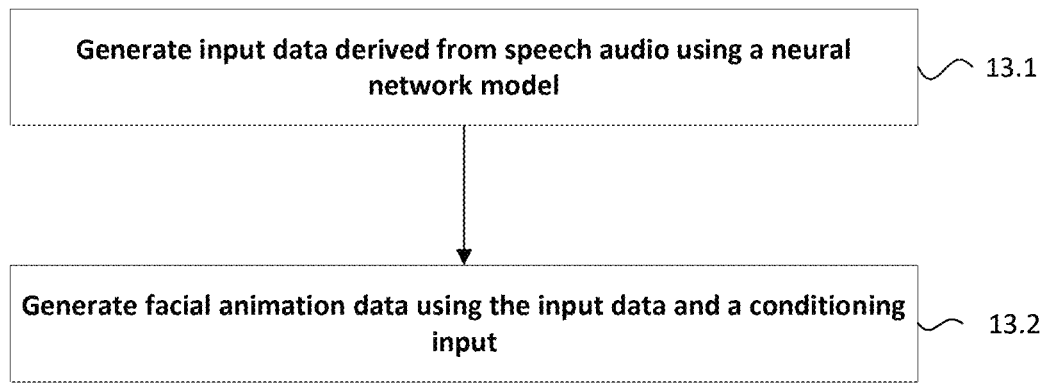
FIG. 13 is a flow diagram illustrating an example method for generating facial animation data using inputs generated using a neural network model that has been trained to perform a speech processing task.

FIG. 13 is a flow diagram illustrating an example method 1300 for generating facial animation data using inputs generated using a neural network model that has been trained to perform a speech processing task. The facial animation data animates a face in a video game in accordance with speech sounds of speech audio.

In step 13.1, input data derived from the speech audio is generated using the neural network model. This comprises processing the speech audio using the neural network model; and providing the input data from outputs generated by one or more neural network layers of the neural network model.

The neural network model may be trained to perform speech transcription.

In step 13.2, the facial animation data is generated using the input data and a conditioning input. This comprises processing the input data derived from the speech audio and the conditioning input using a machine-learned generative model.

The facial animation data may comprise mesh data for a facial mesh. The facial animation data may comprise rig parameters for a facial animation rig. The rig parameters for the facial animation rig may be generated by: generating, as output of the machine-learned generative model, mesh data for a facial mesh; and generating the rig parameters for the facial animation rig, comprising processing the mesh data using a machine-learned mesh-to-rig model.

Although the technology has been described in the context of video games, it will be appreciated that the methods and systems described herein could alternatively be used in any other area in which animation is used (e.g. film, television etc.)

Figure 14:
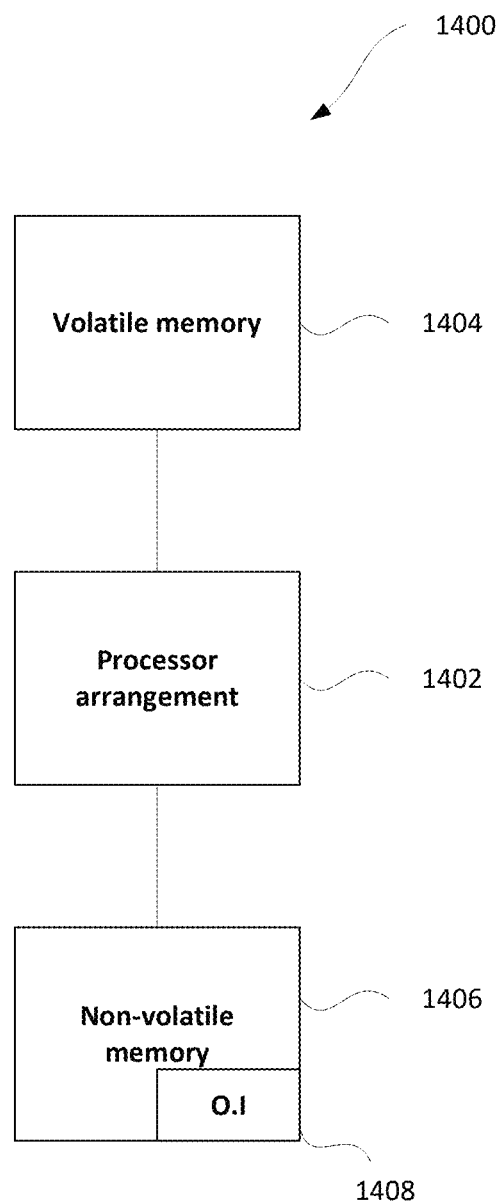
FIG. 14 shows a schematic example of a system/apparatus for performing any of the methods described herein.

FIG. 14 shows a schematic example of a system/apparatus for performing any of the methods described herein. The system/apparatus shown is an example of a computing device. It will be appreciated by the skilled person that other types of computing devices/systems may alternatively be used to implement the methods described herein, such as a distributed computing system.

The apparatus (or system) 1400 comprises one or more processors 1402. The one or more processors control operation of other components of the system/apparatus 1400. The one or more processors 1402 may, for example, comprise a general purpose processor. The one or more processors 1402 may be a single core device or a multiple core device. The one or more processors 1402 may comprise a central processing unit (CPU) or a graphical processing unit (GPU). Alternatively, the one or more processors 1402 may comprise specialised processing hardware, for instance a RISC processor or programmable hardware with embedded firmware. Multiple processors may be included.

The system/apparatus comprises a working or volatile memory 1404. The one or more processors may access the volatile memory 1404 in order to process data and may control the storage of data in memory. The volatile memory 1404 may comprise RAM of any type, for example Static RAM (SRAM), Dynamic RAM (DRAM), or it may comprise Flash memory, such as an SD-Card.

The system/apparatus comprises a non-volatile memory 1406. The non-volatile memory 1406 stores a set of operation instructions 1408 for controlling the operation of the processors 1402 in the form of computer readable instructions. The non-volatile memory 1406 may be a memory of any kind such as a Read Only Memory (ROM), a Flash memory or a magnetic drive memory.

The one or more processors 1402 are configured to execute operating instructions 1408 to cause the system/apparatus to perform any of the methods described herein. The operating instructions 1408 may comprise code (i.e. drivers) relating to the hardware components of the system/apparatus 1400, as well as code relating to the basic operation of the system/apparatus 1400. Generally speaking, the one or more processors 1402 execute one or more instructions of the operating instructions 1408, which are stored permanently or semi-permanently in the non-volatile memory 1406, using the volatile memory 1404 to temporarily store data generated during execution of said operating instructions 1408.

Implementations of the methods, apparatus and/or systems as described herein may be realised as in digital electronic circuitry, integrated circuitry, specially designed ASICs (application specific integrated circuits), system-on-chip (SoC) integrated circuitry, computer hardware, firmware, software, and/or combinations thereof. These may include computer program products (such as software stored on e.g. magnetic discs, optical disks, memory, Programmable Logic Devices) comprising computer readable instructions that, when executed by a computer, such as that described in relation to FIG. 14, cause the computer to perform one or more of the methods described herein.

Implementations of the methods, apparatus and/or systems as described herein may be realised as one or more servers, a plurality of servers and/or computing devices, a distributed system, a cloud-based platform and/or cloud computing system and the like. Thus, for instance, several computing devices and/or servers may be in communication by way of a network connection and may collectively perform tasks described as being performed by the methods, apparatus, computing devices, and/or systems as described herein.

Any system feature as described herein may also be provided as a method feature, and vice versa. As used herein, means plus function features may be expressed alternatively in terms of their corresponding structure. In particular, method aspects may be applied to system aspects, and vice versa.

Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

Although several embodiments have been shown and described, it would be appreciated by those skilled in the art that changes may be made in these embodiments without departing from the principles of this disclosure, the scope of which is defined in the claims.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

The invention claimed is:

1. A computer-implemented method, the method comprising:
obtaining a trained generative machine-learning model, the trained generative machine-learning model configured to process (i) input data derived from speech audio and (ii) a conditioning input representing a particular facial expression to generate facial animation data corresponding to the speech audio and the particular facial expression;
obtaining input data derived from speech audio for processing by the trained generative machine-learning model;
determining a conditioning input representing a particular facial expression from a set of reference speech animation examples, each reference speech animation example comprising data derived from speech audio and corresponding ground-truth facial animation data having the particular facial expression, wherein determining the conditioning input comprises:
initializing the conditioning input;
processing, using the trained generative machine-learning model: (i) the conditioning input, and (ii) the data derived from speech audio of one or more reference speech animation examples from the set of reference speech animation examples;
generating, as output of the trained generative machine learning model, predicted facial animation data for each reference speech animation example;
determining a loss for each reference speech animation example, wherein the loss for a reference speech animation example is dependent on the predicted facial animation data and the ground truth facial animation data of the reference speech animation example; and
updating the conditioning input based on the losses of the speech animation examples whilst the weights of the trained generative machine-learning model are held frozen;
processing, by the trained generative machine-learning model, (i) the input data derived from speech audio for processing and (ii) the determined conditioning input representing a particular facial expression from the set of reference speech animation examples to generate facial animation data corresponding to the speech audio and the particular facial expression.

2. The method of claim 1, wherein the facial animation data animates a face in a video game.

3. The method of claim 1, wherein updating the conditioning input comprises:
updating the conditioning input using a gradient-based optimization procedure and the losses of the reference speech animation examples.

4. The method of claim 1, wherein determining the loss for a reference speech animation example comprises performing a comparison between the predicted facial animation data and the ground-truth facial animation data of the reference speech animation example.

5. The method of claim 1, wherein the one or more reference speech animation examples comprises a plurality of speech animation examples generated using speech audio associated with a plurality of speakers.

6. A system comprising:
one or more computing devices; and
one or more storage devices communicatively coupled to the one or more computing devices, wherein the one or more storage devices store instructions that, when executed by the one or more computing devices, cause the one or more computing devices to perform operations comprising:
obtaining a trained generative machine-learning model, the trained generative machine-learning model configured to process (i) input data derived from speech audio and (ii) a conditioning input representing a particular facial expression to generate facial animation data corresponding to the speech audio and the particular facial expression;
obtaining input data derived from speech audio for processing by the trained generative machine-learning model;

determining a conditioning input representing a particular facial expression from a set of reference speech animation examples, each reference speech animation example comprising data derived from speech audio and corresponding ground-truth facial animation data having the particular facial expression, wherein determining the conditioning input comprises:
- initializing the conditioning input;
- processing, using the trained generative machine-learning model: (i) the conditioning input, and (ii) the data derived from speech audio of one or more reference speech animation examples from the set of reference speech animation examples;
- generating, as output of the trained generative machine-learning model, predicted facial animation data for each reference speech animation example;
- determining a loss for each reference speech animation example, wherein the loss for a reference speech animation example is dependent on the predicted facial animation data and the ground-truth facial animation data of the reference speech animation example; and
- updating the conditioning input based on the losses of the speech animation examples whilst the weights of the trained generative machine-learning model are held frozen;

processing, by the trained generative machine-learning model, (i) the input data derived from speech audio for processing and (ii) the determined conditioning input representing a particular facial expression from the set of reference speech animation examples to generate facial animation data corresponding to the speech audio and the particular facial expression.

7. The system of claim 6, wherein the facial animation data animates a face in a video game.

8. The system of claim 6, wherein updating the conditioning input comprises:
updating the conditioning input using a gradient-based optimization procedure and the losses of the reference speech animation examples.

9. The system of claim 6, wherein determining the loss for a reference speech animation example comprises performing a comparison between the predicted facial animation data and the ground-truth facial animation data of the reference speech animation example.

10. The system of claim 6, wherein the one or more reference speech animation examples comprises a plurality of speech animation examples generated using speech audio associated with a plurality of speakers.

11. One or more non-transitory computer storage media storing instructions that when executed by one or more computing devices cause the one or more computing devices to perform operations comprising:
obtaining a trained generative machine learning model, the trained generative machine learning model configured to process (i) input data derived from speech audio and (ii) a conditioning input representing a particular facial expression to generate facial animation data corresponding to the speech audio and the particular facial expression;

obtaining input data derived from speech audio for processing by the trained generative machine learning model;

determining a conditioning input representing a particular facial expression from a set of reference speech animation examples, each reference speech animation example comprising data derived from speech audio and corresponding ground-truth facial animation data having the particular facial expression, wherein determining the conditioning input comprises:
- initializing the conditioning input;
- processing, using the trained generative machine-learning model: (i) the conditioning input, and (ii) the data derived from speech audio of one or more reference speech animation examples from the set of reference speech animation examples;
- generating, as output of the trained generative machine-learning model, predicted facial animation data for each reference speech animation example;
- determining a loss for each reference speech animation example, wherein the loss for a reference speech animation example is dependent on the predicted facial animation data and the ground-truth facial animation data of the reference speech animation example; and
- updating the conditioning input based on the losses of the speech animation examples whilst the weights of the trained generative machine learning model are held frozen;

processing, by the trained generative machine learning model, (i) the input data derived from speech audio for processing and (ii) the determined conditioning input representing a particular facial expression from the set of reference speech animation examples to generate facial animation data corresponding to the speech audio and the particular facial expression.

12. The non-transitory computer storage media of claim 11, wherein the facial animation data animates a face in a video game.

13. The non-transitory computer storage media of claim 11, wherein updating the conditioning input comprises:
updating the conditioning input using a gradient-based optimization procedure and the losses of the reference speech animation examples.

14. The non-transitory computer storage media of claim 11, wherein determining the loss for a reference speech animation example comprises performing a comparison between the predicted facial animation data and the ground-truth facial animation data of the reference speech animation example.

15. The non-transitory computer storage media of claim 11, wherein the one or more reference speech animation examples comprises a plurality of speech animation examples generated using speech audio associated with a plurality of speakers.

* * * * *